US012722711B2

(12) United States Patent
Renegar

(10) Patent No.: US 12,722,711 B2
(45) Date of Patent: Sep. 1, 2026

(54) SILL BEAM UNIFORM DECELERATION UNIT

(71) Applicant: Tesseract Structural Innovations, Inc., Fayetteville, AR (US)

(72) Inventor: Henry L. Renegar, Fayetteville, AR (US)

(73) Assignee: Tesseract Structural Innovations, Inc., Fayetteville, AR (US)

( * ) Notice: Subject to any disclaimer, the term of this patent is extended or adjusted under 35 U.S.C. 154(b) by 299 days.

(21) Appl. No.: 18/466,627

(22) Filed: Sep. 13, 2023

(65) Prior Publication Data

US 2024/0083512 A1 Mar. 14, 2024

Related U.S. Application Data

(60) Provisional application No. 63/406,180, filed on Sep. 13, 2022.

(51) Int. Cl.
*B62D 25/02* (2006.01)
*B62D 21/15* (2006.01)

(52) U.S. Cl.
CPC ......... *B62D 25/025* (2013.01); *B62D 21/157* (2013.01)

(58) Field of Classification Search
CPC ...... B62D 25/025; B62D 25/04; B62D 25/08; B62D 25/081; B62D 25/20; B62D 25/2018; B62D 25/2027; B62D 25/2036; B62D 25/2045; B62D 25/145; B62D 23/005; B60R 19/18; B60R 19/1806; B60R 19/1846; B60R 19/34
USPC ......... 296/29, 193.06, 7, 8, 9, 23.01, 3, 201, 296/204, 205
See application file for complete search history.

(56) References Cited

U.S. PATENT DOCUMENTS

| | | | |
|---|---|---|---|
| 4,029,350 | A | 6/1977 | Goupy et al. |
| 4,190,275 | A | 2/1980 | Mileti |
| 4,352,484 | A | 10/1982 | Gertz et al. |
| 4,822,011 | A | 4/1989 | Goldbach et al. |
| 4,934,751 | A | 6/1990 | Shimoda |

(Continued)

FOREIGN PATENT DOCUMENTS

| | | |
|---|---|---|
| CA | 2422415 A1 | 9/2003 |
| DE | 196 15 875 A1 | 10/1997 |

(Continued)

OTHER PUBLICATIONS

[No Author Listed] CYMAT: Aluminum Foam Technology Applied to Automotive Design. 10 pages.

*Primary Examiner* — Amy R Weisberg

(57) ABSTRACT

Devices and methods for absorbing vehicle crash energy with a safety device are disclosed. The safety device may function as a uniform deceleration unit (UDU). In some embodiments, the UDUs described herein may include an assembly of an inner skin stiffener and an energy absorber, arranged inside of an outer skin casing. The inner skin stiffener may have a series of projections configured to engage with holes in the energy absorber which may help retain the two components fixed relative to one another. In some embodiments, the energy absorber may be formed of a low density material, such as a monolithic metallic foam material. The projections of the inner skin stiffener may be formed using a press forming method to simplify the manufacturability of the UDU and enhance the overall system throughput.

19 Claims, 15 Drawing Sheets

(56) References Cited

U.S. PATENT DOCUMENTS 4,969,680 A 11/1990 Shimoda
5,354,115 A 10/1994 Esaki
5,462,144 A 10/1995 Guardiola et al.
5,547,737 A 8/1996 Evans et al.
5,613,727 A 3/1997 Yamazaki
5,906,410 A 5/1999 Dalinkiewicz
5,924,765 A 7/1999 Lee
5,984,402 A 11/1999 Takeuchi
5,997,057 A * 12/1999 Gasko .................... B60R 19/18 293/102
6,007,123 A 12/1999 Schwartz et al.
6,142,563 A 11/2000 Townsend et al.
6,179,355 B1 1/2001 Chou et al.
6,270,131 B1 8/2001 Martinez et al.
6,286,867 B1 9/2001 Braemig et al.
6,296,299 B1 10/2001 Hanakawa et al.
6,341,813 B1 1/2002 Taghaddos
6,354,656 B1 3/2002 Hwang
6,386,625 B1 5/2002 Dukat et al.
6,428,085 B1 8/2002 Miyasaka et al.
6,431,641 B2 8/2002 Miyasaka
6,547,295 B2 4/2003 Vismara
6,726,258 B1 4/2004 Sundgren et al.
6,729,451 B2 5/2004 Yamagiwa
6,758,507 B2 7/2004 Tarahomi et al.
6,761,394 B2 7/2004 Gennai et al.
6,817,654 B2 11/2004 Kitagawa et al.
6,824,200 B2 11/2004 Tomita
6,840,301 B2 1/2005 Nichol et al.
6,854,795 B2 2/2005 Yamazaki et al.
6,866,084 B2 3/2005 Åsholt et al.
6,932,146 B2 8/2005 Nichol et al.
6,932,405 B2 8/2005 Nakagawa et al.
6,976,730 B2 12/2005 Mally et al.
6,998,535 B2 2/2006 Nichol
7,114,764 B1 10/2006 Barsoum et al.
7,147,272 B2 12/2006 Odaka et al.
7,163,259 B2 1/2007 Hayashi
7,264,302 B2 9/2007 Nagashima
7,341,277 B2 3/2008 Huttsell et al.
7,562,929 B2 7/2009 Schiebel et al.
7,594,691 B2 9/2009 Koormann et al.
7,614,683 B2 11/2009 Roccato et al.
7,963,588 B2 6/2011 Kanagai et al.
8,002,339 B2 8/2011 Rill et al.
8,007,038 B2 8/2011 Stoeckl
8,041,824 B1 10/2011 Maeng
8,152,210 B2 4/2012 Lutke-Bexten et al.
8,366,185 B2 2/2013 Herntier
8,511,746 B2 8/2013 Kawamura et al.
8,641,131 B2 2/2014 Honda et al.
8,684,427 B2 4/2014 Marur et al.
8,696,051 B2 4/2014 Charbonneau et al.
8,708,402 B2 4/2014 Saeki
8,720,985 B2 5/2014 Izumi et al.
8,833,839 B2 9/2014 Young et al.
8,851,556 B2 10/2014 Nishimura et al.
8,864,216 B2 10/2014 Nagwanshi et al.
8,888,173 B2 11/2014 Nydam et al.
8,960,780 B2 2/2015 Nydam et al.
8,979,146 B2 3/2015 Kano et al.
8,979,177 B2 3/2015 Kim et al.
9,187,131 B2 11/2015 Young et al.
9,187,134 B2 11/2015 Matsuura et al.
9,321,487 B2 4/2016 Honda et al.
9,394,005 B1 7/2016 Enders
9,493,190 B1 11/2016 Alwan et al.
9,505,442 B2 11/2016 Wu et al.
9,537,769 B2 1/2017 Bryant et al.
9,821,854 B2 11/2017 Bach
9,908,562 B2 3/2018 Mukainakano et al.
9,981,695 B2 5/2018 Sunohara et al.
10,029,734 B2 7/2018 Akhlaque-e-Rasul et al.
10,035,544 B2 7/2018 Lee et al.
10,077,080 B2 9/2018 Matsuda et al.
10,112,653 B2 10/2018 Abe
10,155,542 B2 12/2018 Gao et al.
10,243,847 B2 3/2019 Previdi et al.
10,259,506 B2 4/2019 Ayukawa
10,286,956 B2 5/2019 Keuthage et al.
10,556,559 B2 2/2020 Renegar
10,603,998 B2 3/2020 Toyota
10,710,638 B2 7/2020 Kawase et al.
10,800,459 B2 10/2020 Ayukawa
11,021,120 B2 6/2021 Renegar
11,040,680 B2 6/2021 Renegar
11,097,676 B2 8/2021 Renegar
11,097,782 B2 8/2021 Renegar
11,654,847 B2 5/2023 Renegar
11,820,307 B2 11/2023 Renegar
2002/0012771 A1 1/2002 Fiorinelli et al.
2002/0017805 A1 2/2002 Carroll et al.
2002/0047281 A1 4/2002 Hartel et al.
2002/0053805 A1 5/2002 Azuchi et al.
2003/0030290 A1 2/2003 Yamagiwa
2003/0141712 A1 7/2003 Miyasaka
2003/0227182 A1 12/2003 Yoshida et al.
2004/0046404 A1 3/2004 Kim
2005/0218696 A1 10/2005 Aase et al.
2006/0021697 A1 2/2006 Riley et al.
2006/0082168 A1 4/2006 Joosten et al.
2006/0103044 A1 5/2006 Cate et al.
2007/0096507 A1 5/2007 Brunner et al.
2007/0176440 A1 8/2007 Henseleit
2007/0228776 A1 10/2007 Schiebel et al.
2008/0150273 A1 6/2008 Sugiyama et al.
2008/0309103 A1 12/2008 Frederick et al.
2008/0310344 A1 12/2008 Krishnan et al.
2009/0152901 A1 6/2009 Takeuchi et al.
2009/0160203 A1 6/2009 Garg et al.
2009/0195020 A1 8/2009 Wang et al.
2009/0243315 A1 10/2009 Goldsberry
2009/0289465 A1 11/2009 Heo
2010/0201139 A1 8/2010 Hashimura
2011/0095549 A1 4/2011 Moen et al.
2011/0101714 A1 5/2011 Bator
2011/0121587 A1 5/2011 Handing et al.
2011/0193369 A1 8/2011 Wuest et al.
2011/0210579 A1 9/2011 Marur et al.
2012/0177004 A1 7/2012 Yano et al.
2013/0134739 A1 5/2013 Harris et al.
2013/0161932 A1 6/2013 Murray
2013/0241218 A1 9/2013 Tsuchida et al.
2013/0259863 A1 10/2013 Dockal et al.
2014/0207340 A1 7/2014 Kunsch et al.
2014/0375081 A1 12/2014 Kuriyama et al.
2015/0109902 A1 4/2015 Kumar et al.
2015/0158442 A1 6/2015 Yun et al.
2015/0175093 A1 6/2015 Vaughn, Jr.
2015/0256456 A1 9/2015 Previdi et al.
2015/0307045 A1 10/2015 Matecki et al.
2015/0367798 A1 12/2015 Bobba
2016/0114667 A1 4/2016 Ikeda et al.
2016/0121826 A1 5/2016 Terada et al.
2016/0236718 A1 8/2016 Tatsuwaki et al.
2016/0277294 A1 9/2016 Akiyoshi
2016/0280163 A1 9/2016 Matecki et al.
2016/0330045 A1 11/2016 Tang et al.
2016/0366052 A1 12/2016 Chapman et al.
2017/0015361 A1 1/2017 Koch et al.
2017/0028950 A1 2/2017 Keller et al.
2017/0064717 A1 3/2017 Filsfils et al.
2017/0106429 A1 4/2017 Nakanishi et al.
2017/0237656 A1 8/2017 Gage
2017/0250908 A1 8/2017 Nainar et al.
2017/0253202 A1 9/2017 Holderried et al.
2017/0274848 A1 9/2017 Renegar
2017/0317929 A1 11/2017 Chen et al.
2017/0327065 A1 11/2017 So et al.
2018/0022397 A1 1/2018 Richardson et al.
2018/0077051 A1 3/2018 Nainar et al.
2018/0148106 A1 5/2018 Ayukawa
2018/0222416 A1 8/2018 Jadhav et al.
2018/0241671 A1 8/2018 Bosch et al.

(56) References Cited

U.S. PATENT DOCUMENTS

| | | | |
|---|---|---|---|
| 2019/0152413 | A1 | 5/2019 | Renegar |
| 2019/0248423 | A1 | 8/2019 | Kato et al. |
| 2019/0308574 | A1 | 10/2019 | Renegar |
| 2020/0023905 | A1 | 1/2020 | Kawase |
| 2020/0047281 | A1 | 2/2020 | Lazarus et al. |
| 2020/0101912 | A1 | 4/2020 | Renegar |
| 2020/0377045 | A1 | 12/2020 | Renegar |
| 2021/0163073 | A1 | 6/2021 | Renegar |
| 2021/0331641 | A1 | 10/2021 | Renegar |
| 2022/0250684 | A1 | 8/2022 | Renegar |
| 2022/0289125 | A1 | 9/2022 | Naoi et al. |

FOREIGN PATENT DOCUMENTS

| | | | |
|---|---|---|---|
| DE | 10 2008 062505 | A1 | 8/2009 |
| DE | 10 2009 035778 | A1 | 3/2010 |
| DE | 10 2016 206 642 | A1 | 10/2017 |
| DE | 10 2017 005 938 | B3 | 12/2018 |
| EP | 1 459 941 | A1 | 9/2004 |
| EP | 1 464 547 | A1 | 10/2004 |
| EP | 1 564 079 | A1 | 8/2005 |
| EP | 2 955 085 | A1 | 12/2015 |
| FR | 2 962 390 | A1 | 1/2012 |
| JP | S50-134595 | U | 11/1975 |
| JP | H01-063479 | U | 4/1989 |
| JP | H05-238418 | A | 9/1993 |
| JP | H11-255049 | A | 9/1999 |
| JP | 2000-264255 | A | 9/2000 |
| JP | 2003-048585 | A | 2/2003 |
| JP | 2005-508797 | A | 4/2005 |
| JP | 2006-248284 | A | 9/2006 |
| JP | 2007-045352 | A | 2/2007 |
| JP | 4858183 | B2 | 1/2012 |
| JP | 2016-150685 | A | 8/2016 |
| JP | 2018-504321 | A | 2/2018 |
| KR | 10-1274470 | B1 | 6/2013 |
| WO | WO 99/49236 | A1 | 9/1999 |
| WO | WO 03/042024 | A1 | 5/2003 |
| WO | WO 2004/098820 | A1 | 11/2004 |
| WO | WO 2016/085950 | A1 | 6/2016 |
| WO | WO 2017/184930 | A1 | 10/2017 |
| WO | WO 2019/204350 | A1 | 10/2019 |
| WO | WO 2020/243667 | A1 | 12/2020 |
| WO | WO 2021/174146 | A1 | 9/2021 |

* cited by examiner

SILL BEAM UNIFORM DECELERATION UNIT

CROSS REFERENCE TO RELATED APPLICATION

This application is a Non-Provisional of U.S. Application Ser. No. 63/406,180, filed Sep. 13, 2022, the entire contents which is incorporated herein by reference in its entirety.

FIELD

The disclosed embodiments relate generally to vehicles and more particularly to safety systems arranged to improve the performance of a vehicle in a crash.

BACKGROUND

Automobile accidents are an unfortunate reality in the world today. Tens of millions of car accidents take place globally each year, with an estimated six million of those accidents occurring in the United States alone. As a result, the US National Highway Traffic Safety Administration estimates that approximately 40,000 roadway fatalities took place in 2021 in the United States alone. Beyond the unfortunate fatality or injury experienced by the driver or passengers of automotive vehicles, these accidents can also result in massive financial strain on the automobile's owner and insurance companies. In recent decades, the automotive industry has seen great advances in safety with innovations such as frontal air bags, side curtain airbags, electronic crash avoidance systems, and structural crumple zones, among others. Still, with the safety innovations we have today, there is a demand to further improve the safety of automobiles.

SUMMARY

In some embodiments, vehicle safety devices are disclosed. A vehicle safety device may include an outer skin casing having a longitudinal axis, at least one energy absorber of low density material arranged within the outer skin casing, and at least one inner skin stiffener arranged within the outer skin casing. The outer skin casing is configured to be coupled to a portion of a vehicle. In some embodiments, the at least one low density material has a plurality of openings and the at least one inner skin stiffener includes a plurality of projections extending normal to the longitudinal axis of the outer skin casing, wherein the plurality of projections are arranged at least partially in the plurality of openings.

In other embodiments, methods of forming vehicle safety devices are disclosed. A method of forming a vehicle safety device includes providing an outer skin casing having a longitudinal axis, providing at least one energy absorber having a plurality of openings, providing at least one inner skin stiffener having a plurality of projections extending normal to the longitudinal axis, arranging the plurality of projections into the plurality of openings, and positioning the at least one inner skin stiffener and the at least one energy absorber inside the outer skin casing.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
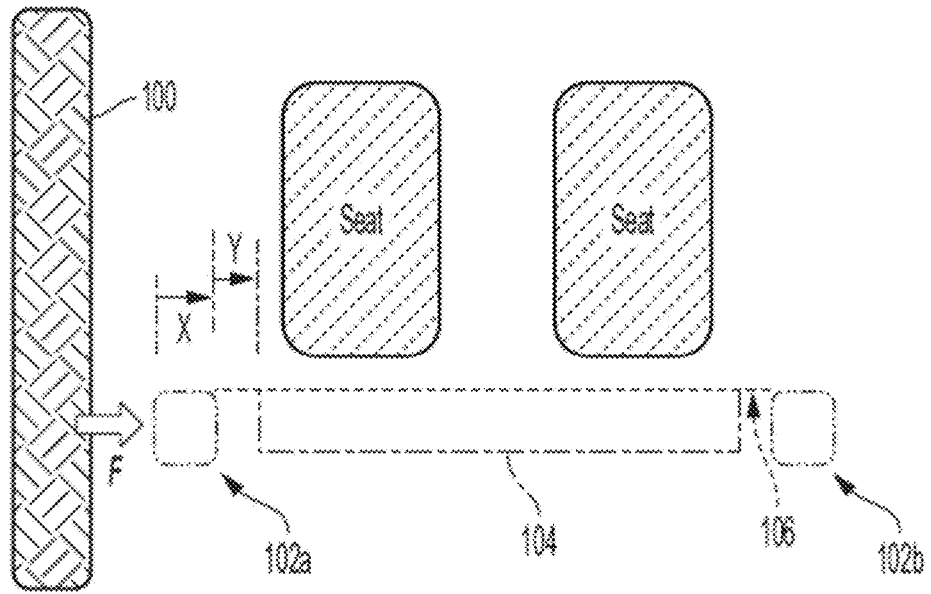
FIG. 1 is schematic of a vehicle in the process of impacting a pole in a NHTSA Side Impact Rigid Pole Test.

Automobile accidents are an unfortunate reality of the world today. Although the automotive industry has seen many safety advances in recent decades, with innovations such as frontal air bags, side curtain airbags, electronic crash avoidance systems, and structural crumple zones, among others, there is still a demand to further improve the safety of automobiles.

In particular, the inventor has recognized the need for side impact protection to protect vehicle occupants in a variety of crash situations. However, with the proliferation of battery powered electric vehicles ("EVs"), the need to protect vehicle occupants is paralleled by the need to protect the vehicle battery during a side impact event. For example, if certain battery chemistries, such as lithium ion cells, are punctured during a vehicle crash, the battery can ignite, and a fire can rapidly spread throughout the vehicle. The inventor has recognized that the vehicle industry would benefit from impact crash solutions that can protect vehicle occupants and the EV battery, without over-stiffening the cross-car vehicle structure or adding excessive mass.

The inventor has also recognized that the vehicle's ability to absorb a significant amount of impact energy in one or more areas is a critical aspect of impact resistance. For example, in crashes involving narrow members such as utility poles, traffic signs, and trees, a significant amount of impact energy in the side structure of the vehicle may be necessary. Accordingly, the US National Highway Traffic Safety Administration has defined a vehicle test called the Side Impact Rigid Pole Test to measure the relative effectiveness of vehicles subjected to impact with a 10" (254 mm) diameter rigid pole structure. According to this test, to prevent injury of the driver in a side pole impact, the vehicle structure must be able to prevent intrusion of the external body (e.g., a pole) into the occupant compartment and limit acceleration to a survivable range.

The inventor has also appreciated that the variations in vehicle size, weight, and internal architecture of various vehicles on the road today may vary the requirements of the safety components involved. For example, in EVs, a battery power pack may be arranged in several different positions in the vehicle, such as the rear of the vehicle (e.g., in the general vicinity of the trunk space), in the front of the vehicle, and/or on the underside of the vehicle. Depending on their arrangement, the battery pack(s) may be susceptible to damage in various collisions such as front end crashes or rear-end collisions. In cases where the batteries are positioned underneath the vehicle, the battery pack may be flattened to fit under the floor pan to avoid reducing the ground clearance for the vehicle. Accordingly, to increase the number of cells in the flat battery arrangement to increase power and range of the vehicle, the cross-sectional area of the battery pack may need to be increased, driving the outer perimeter of the battery pack towards or even to the sill beam structure, also known as the rocker beam, of the vehicle.

The inventor has recognized that protecting an EV battery pack may include absorbing crash energy, limiting crash forces, and/or limiting inward deflection of the sill beam to prevent contact between the sill beam and the battery pack. FIG. 1 shows a schematic representation of a vehicle in the process of impacting a pole 100 in a NHTSA Side Impact Rigid Pole test (see the direction of force labeled F), the vehicle having first and second side sill beams 102*a*, 102*b*, and a battery pack 104 located under a floor pan 106. As depicted in FIG. 1, Applicant has recognized that advantages may be realized by minimizing the sill deflection X and maximizing the gap Y to minimize or even prevent battery pack intrusion. In such an example, limiting side sill displacement may protect the battery mounted under the floor pan.

Based on the foregoing, the inventor has recognized the benefits associated with an energy absorption device for reducing the impact of a vehicular collision on the vehicle and people inside the vehicle. The device may absorb collision/crash energy, limit the crash forces transmitted from the impact site to the rest of the vehicle, and/or limit deformation of the impact site. The inventor has also recognized the benefits associated with a safety device produced in a high throughput fashion with a simplified manufacturing technique, allowing the device to be readily designed to fit various architectures of different vehicles, as well as various portions of a given vehicle. However, instances in which different benefits are offered by the systems and methods disclosed herein are also possible.

In some embodiments, a safety device may be referred to as a uniform deceleration unit (hereinafter referred to as "UDU"), arranged to absorb crash energy, limit crash forces, and/or limit inward deformation of the impact site. The UDU may include an assembly of an inner skin stiffener and an energy absorber arranged inside of an outer skin casing. The inner skin stiffener may include features (e.g., conical projections) which serve to absorb energy from a collision/crash at the impact site and limit the transmission of crash force to the rest of the vehicle. The inner skin stiffener may be formed of a monolithic piece of material. In some embodiments, the projections (and/or any other features) may be press formed from the monolithic piece, allowing the inner skin stiffener to be formed in a rapid manner. The energy absorber, which may be formed of a low density material, may also be formed in a monolithic fashion, as will be described in further detail below. The simplicity of the various structural components of the UDU may serve to improve its manufacturability and subsequently maximize the production throughput. It should be appreciated that the outer skin casing, inner skin stiffener(s), and the energy absorber(s) may all absorb crash energy to limit the deformation of the impact site.

In some embodiments, the inner skin stiffener may enhance the structural integrity of the UDU by providing strength in one or more directions depending on the geometry of the inner skin stiffener and its constituent components. For example, the inner skin stiffener may stiffen the side sill of a vehicle in a particular direction to absorb stresses and vibrations commonly experienced by the vehicle in normal usage conditions, in addition to providing structural support to the UDU during a collision. The inner skin stiffener may include projections designed to undergo deformation upon absorption of energy from a collision, which may further stiffen the projections, providing enhanced energy absorption and reducing the amount of collision energy transmitted to the rest of the vehicle. In some embodiments, a combination of the high strength and relatively dense inner skin stiffener with a low density energy absorber may strike a balance between the total weight and strength of the UDU.

In some embodiments, the inner skin stiffener and the outer skin casing, may be designed to plastically deform at a specific load and then continue to deform until the low density energy absorber material has compressed to a range where the compression load of the internal skin stiffener and the low density energy absorber is relatively constant for a given displacement range. In some embodiments, such as with metallic foams, honeycomb materials, etc., the low density energy absorber material may compress without substantial change in volume. In such cases, the low density energy absorber may provide lateral support to the inner skin stiffeners during crushing to help prevent buckling of those inner skin stiffeners. The low density energy absorber material positioned around and/or inside the stiffening protrusions may act to maintain the crush forces developed in the protrusions by preventing buckling and collapse, thereby extending the crushing distance at the relatively constant force. Accordingly, in some embodiments, the low density energy absorber may serve a dual function of providing energy absorbance itself as well as enhancing the energy absorption performance of the inner skin stiffener.

In some embodiments, the UDU may enhance the safety of the vehicle on which it is installed by virtue of absorbing a portion of the kinetic energy of the vehicle at the impact site (and/or any other portion of the vehicle), and converting the kinetic energy into strain energy. During a vehicle collision/crash, a UDU may initially deform elastically and, with increasing crash force, deform in its plastic regime. In some embodiments, the energy absorbing material may also deform upon impact to minimize or reduce the risk of significant damage to the vehicle. For example, in some embodiments, the energy absorption properties of the UDU may reduce the risk of a vehicle segment (e.g., side sill beam) through other segments of the vehicle, and potentially through battery packs. Accordingly, the effects of a collision may be mitigated.

It should be appreciated that the UDUs described herein may be incorporated into both new and existing vehicles, with little to no modification to the vehicle. Accordingly, the UDUs of the present disclosure may be associated with various mounting brackets, flanges, and/or connection mechanisms to facilitate the coupling of the UDUs with the vehicle. The UDU may be fixed to the vehicle through any number of mechanical, physical, or chemical means, including but not limited to screws, bolts, rivets, glue, high strength adhesive, welding, solid state joining, or incorporation into an existing structural component of the vehicle.

A typical small EV may weigh approximately 3500 lb (1588 kg), varying depending on vehicle design and battery pack size. At the standard 32 km/hr speed of the Side Impact Rigid Pole Test, the total kinetic energy of the 3500 lb vehicle may be about 62 kJ. The UDUs described herein may be designed to limit the transmission of this crash kinetic energy to the rest of the vehicle, by absorbing at least a portion of the crash energy, and therefore reducing the risk of damage. In some embodiments, the UDUs may be designed with a safety factor, such that they may absorb a multiple of the crash kinetic energy.

In some embodiments, detailed geometries and materials of construction of the UDU may be tuned to increase or reduce the amount of crash energy absorbed, depending on the crush strength of other structural members to which the UDU is attached. For purposes herein, structural members may include items such as headlight frame, front bumper, fender, lower dash panel, A-pillar, hinge pillar, B-pillar, C-pillar, rocker, sill beam, amongst others. Depending on specific UDU embodiment, the UDU may be able to absorb greater than or equal to 10%, 20%, 30%, 40%, 50%, 60%, 70%, 80%, 90%, 100%, and/or any other suitable percentage of the total crash energy. The UDU may also absorb less than or equal to 100%, 90%, 80%, 70%, 60%, 50%, 40%, 30%, 20%, 10%, and/or any other suitable percentage of the total crash energy. Combinations of the foregoing, including UDUs which absorb between 10% and 100% of the total crash energy are also contemplated. It should be appreciated that the present disclosure is not limited by the proportion of kinetic energy that the UDUs described herein may absorb, as the arrangement of the UDU in the vehicle, the number of UDUs used, and/or the model of the vehicle may factor into the proportion of crash energy absorbed per UDU.

In some embodiments, the UDU may be designed to absorb greater than or equal to 30 kJ, 50 kJ, 70 kJ, 90 kJ, 100 kJ, 125 kJ, 150 kJ, 200 kJ, 250 kJ, and/or any other amount of kinetic energy. The UDU may also be designed to absorb less than or equal to 250 kJ, 200 kJ, 150 kJ, 125 kJ, 100 kJ, 90 kJ, 70 kJ, 50 kJ, 30 kJ, and/or any other amount of kinetic energy. Combinations of the foregoing, including UDUs which absorb between 30 kJ and 250 kJ of kinetic energy are also contemplated. It should be appreciated that the present disclosure is not limited by the total volume of kinetic energy that the UDUs described herein may absorb, as the arrangement of the UDU in the vehicle, the number of UDUs used, and/or the model of the vehicle may factor into the total kinetic energy absorbed per UDU.

In some embodiments, the UDUs of the present disclosure may convert a portion of the kinetic energy of a collision or crash into strain energy by experiencing structural deformation. Each UDU may convert greater than or equal to 1%, 2%, 5%, 10%, 20%, 30%, 50%, 75%, 80%, 90%, 99%, 100%, and/or any other suitable percentage of the kinetic energy into strain energy. Each UDU may also convert less than or equal to 100%, 99%, 90%, 80%, 75%, 50%, 30%, 20%, 10%, 5%, 2%, 1%, and/or any other suitable percentage of the kinetic energy into strain energy. Combinations of the foregoing ranges, including UDUs converting between 1% and 100% of crash kinetic energy into strain energy are also contemplated. It should be appreciated that the amount of energy converted may be highly dependent upon the arrangement of the UDU in the vehicle, the number of UDUs used, and/or the model of the vehicle. Accordingly, the present disclosure is not limited by the percentage of kinetic energy converted into strain energy.

It should be appreciated that the energy absorbers of the present disclosure may include any suitable high strength, low density material, including, but not limited to, metallic foams (e.g., closed cell aluminum foam), metallic honeycomb materials, expanding polymer foams, energy absorbing composites, cellular materials such as thin-walled tube arrays, combinations thereof (e.g., tubes filled with metallic foam), and/or any other suitable material or combination of materials. The cross-sectional shape of the tubes in the tube arrays may be round, rectangular, or other closed geometric or organic shape. The tubes may be sandwiched between layers of light weight, high strength material. The bank of tubes may be either a single layer, a double layer, or multiple layers using a material or materials that are ductile, high strength, and relatively low modulus. This configuration may be formed by a variety of methods including extrusion, casting, additive manufacturing (e.g., printing), combinations thereof, and/or other metal forming techniques. The tube array may be generated as one continuous part or it may be formed from multiple discrete tubes joined together.

In embodiments where the energy absorber is porous (e.g., metallic foams), the porosity of the energy absorber may be between 80% and 94%, although other porosities are also contemplated. It should be appreciated that the density and/or porosity of the energy absorber material may be selected to optimize cost as well as capacity to dissipate crash energy.

It should be appreciated that the term “vehicle” as used herein may refer to any machine that transports people and/or cargo. The UDUs of the present disclosure may be employed with vehicles including, but not limited to, motor vehicles, automobiles, bicycles, wagons, railed vehicles, watercraft, personal mobility vehicles, aircraft (e.g., airplanes), unmanned aerial vehicles such as drones, motorcycles, robots, electrical vehicles, and/or any other machine susceptible to collisions.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 2A:
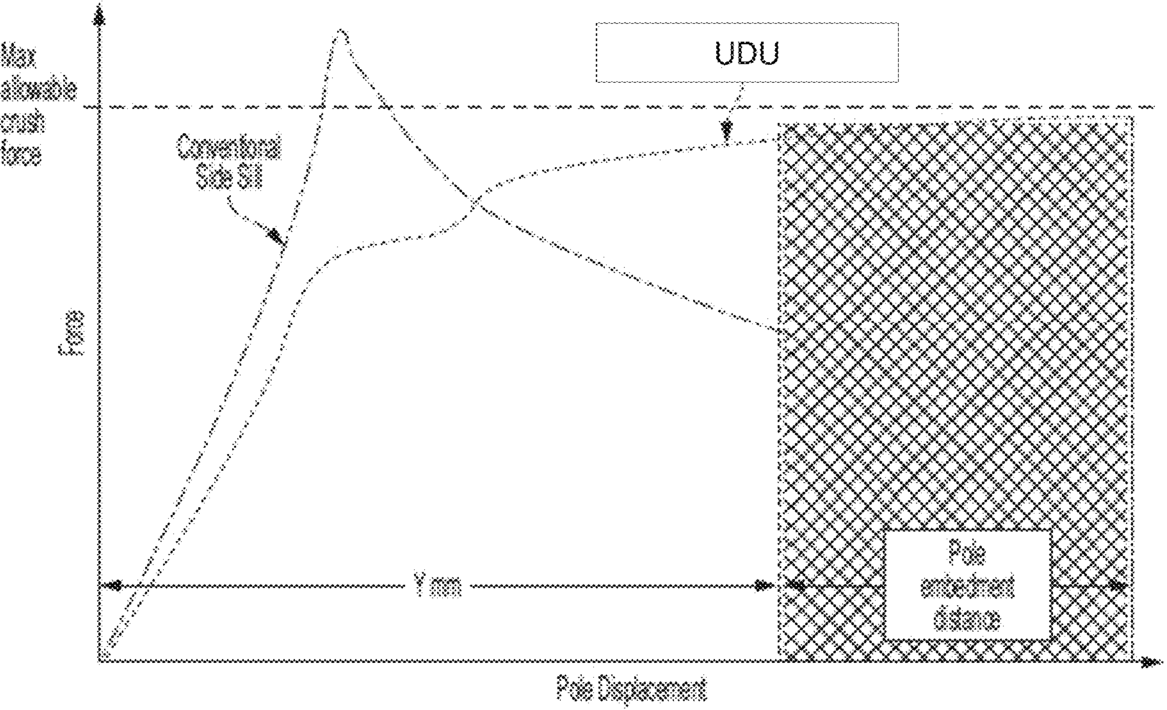
FIG. 2A is a plot of force as a function of displacement of a safety device, according to some embodiments.

In some embodiments, the internal architecture of the UDU may be designed to achieve a desired energy absorption profile in the instance of a vehicle collision/crash. In some embodiments, the UDU may be designed to deform in a uniform fashion to approach ideal energy absorption. For example, FIG. 2A represents a smooth displacement curve for an embodiment of a UDU of the present disclosure compared to a conventional side sill. The exemplary UDU used in the test of FIG. 2A includes four individual layers for absorbing energy. Each layer may have a slightly different stiffness, forming a stiffness gradient which results in sequential crushing. The outermost layer may be designed to allow an impact source (e.g., a pole) to embed into the UDU to distribute the crash force over the largest possible area. The next three layers may be designed to absorb specific magnitudes of energy while limiting the overall displacement of the side sill. As shown, the UDU helps to reduce the overall crush force by absorbing the crash energy and by limiting the energy transmitted from the impact site to other areas of the vehicle. It should be appreciated that other configurations of UDUs, including more than or less than four layers, having uniform or variable stiffnesses, as well combinations thereof, are also contemplated to achieve a desired embedment distance of the impact source into the vehicle and the total displacement of the UDU. In some embodiments, the total embedment distance may control the level of intrusion of the impact source into a battery pack and/or any other internal component.

In some embodiments, the UDU may increase the relative displacement of an impact source (e.g., a pole) into a portion of the vehicle (e.g., a side sill) by allowing the impact source to be embedded in the body of the UDU. In some embodiments, the additional embedment distance of the impact source into the UDU may increase the total energy absorption of the UDU. For example, as shown in FIG. 2A, the maximum allowable displacement of the structure may be Y mm in some embodiments. In such embodiments, the total energy absorbed by the UDU (shown by the area under the pole F-D curve), may be increased by pole embedment. See, e.g., the area under the curve in the region labeled pole embedment distance. Accordingly, in some embodiments, the pole embedment effectively increases the crush distance for the UDU.

Figure 2B:
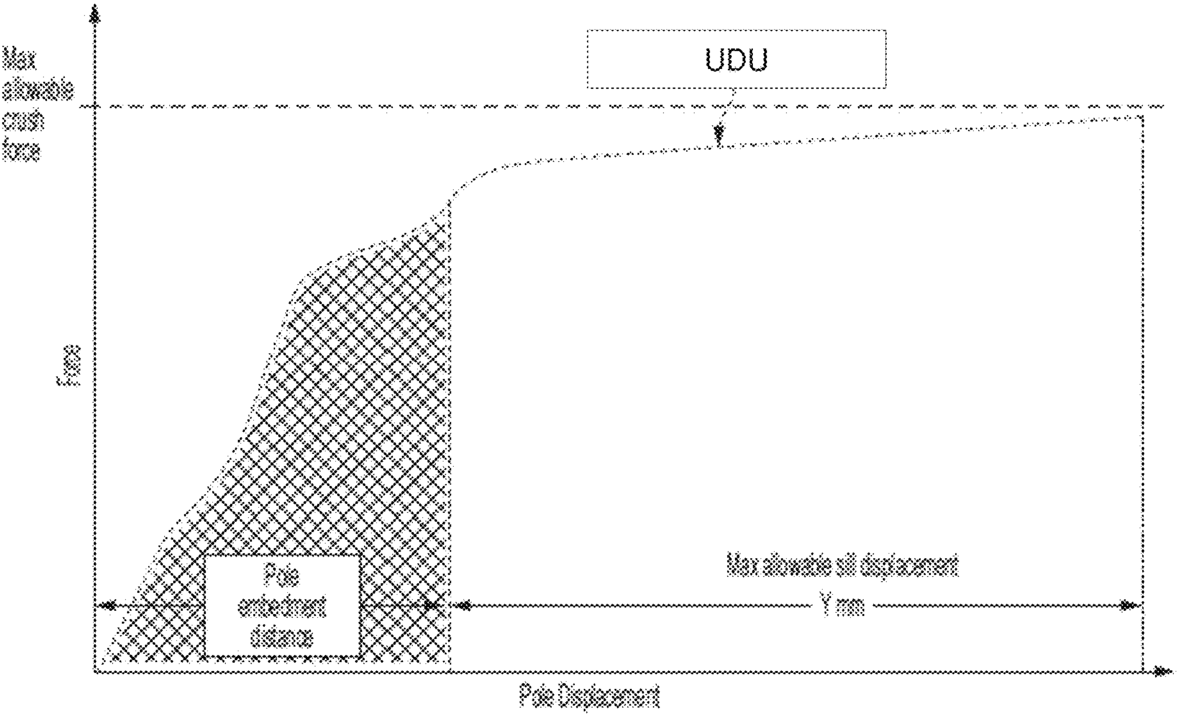
FIG. 2B is a plot of force as a function of displacement of a safety device, according to other embodiments.

In some embodiments, pole embedment may occur at an onset of a crash. For example, as shown in FIG. 2B, pole embedment into the UDU is shown at the outset of the crash, and subsequently during the crash, generating excess energy absorption. As with FIG. 2A, and as shown in FIG. 2B, pole embedment may increase the crush distance for the UDUs.

Figure 3:
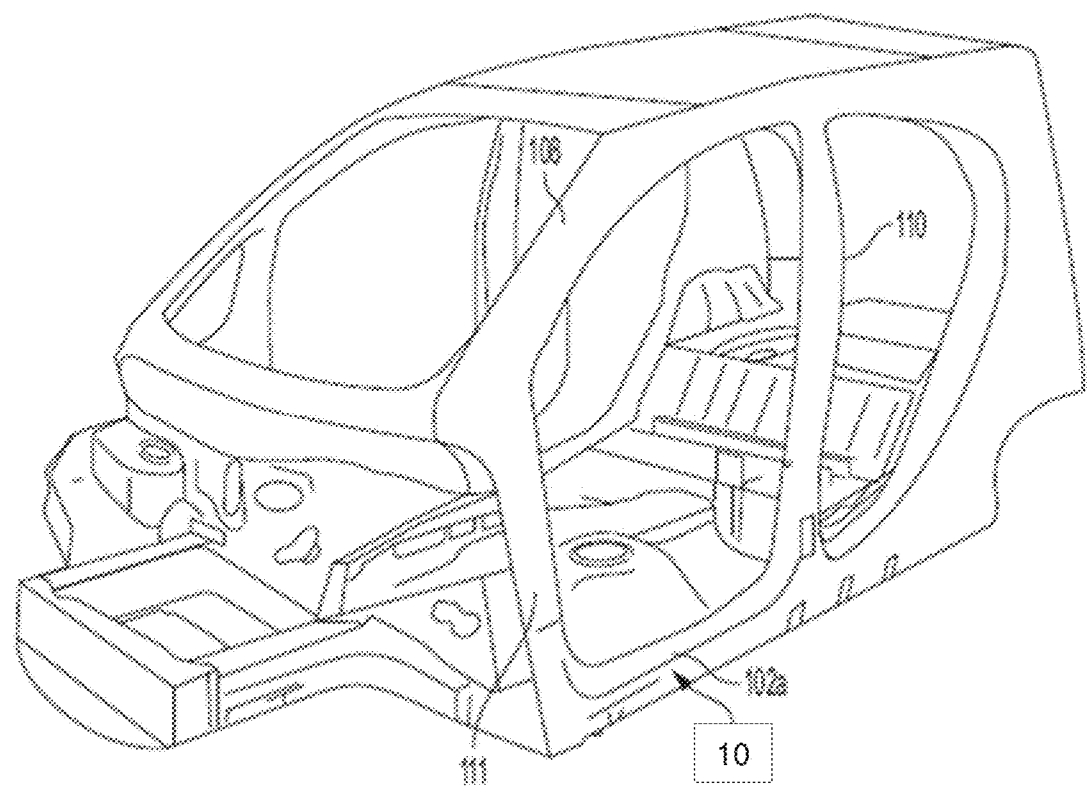
FIG. 3 is a schematic of the spatial arrangement of a safety device in a vehicle according to some embodiments.

It should be appreciated that the UDUs of the present disclosure may be compatible with any suitable portion of a vehicle, including, but not limited to, bumpers, fender, cowl panel, door, rocker panel, hinge pillar, wheelhouse, hood, firewall, trunk, combinations thereof, and/or others are also contemplated. For example, FIG. 3 shows an exemplary inner frame of a vehicle having a sill beam 102*a*, an A-Pillar 108, a B-Pillar 110, and a hinge pillar 111. A UDU 10 of the present disclosure may be integrated onto and/or into the side sill 102*a* of a vehicle, as shown in FIG. 3. It should be appreciated that although only one side beam and respective UDU are represented in this figure, the vehicle may include a second UDU and sill beam on the second, opposite side of the vehicle. Accordingly, the UDUs of the present disclosure are not limited by the location of the vehicle in which they are integrated/installed. It should be appreciated that in some embodiments, multiple UDUs may be integrated into various portions of a vehicle.

In some embodiments, multiple UDUs may be employed to enhance the energy absorption of a vehicle in a side crash, including inside the vehicle side sill, inboard of the side sill, exterior to the side sill, part of the EV battery tray, combinations thereof, and/or in any other location or combinations of locations of the vehicle.

Figure 4:
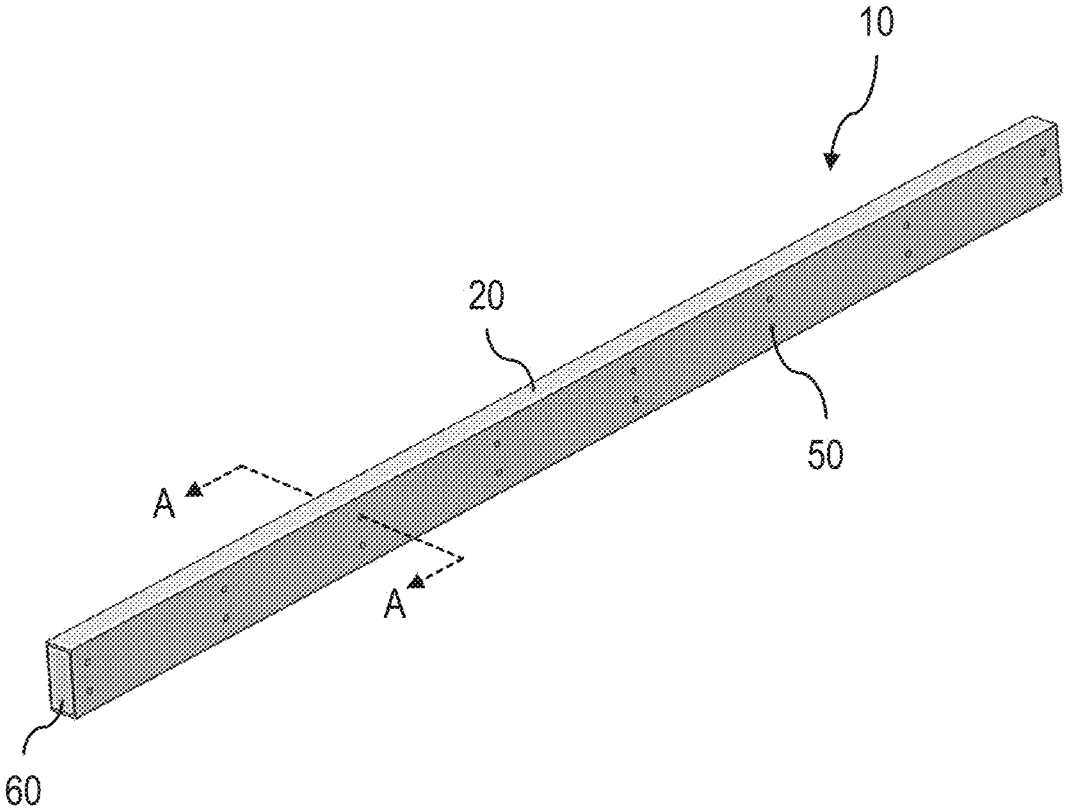
FIG. 4 is a top perspective view of a safety device according to some embodiments.

FIG. 4 illustrates an assembled UDU 10 according to some embodiments. The UDU may include an outer skin casing 20 which may house an assembly of an inner skin stiffener and an energy absorber of low density material, all of which may be configured to absorb crash energy. In some embodiments, the energy absorber may be formed of a metallic foam, although other low-density configurations are also contemplated. The outer skin casing may be formed of a monolithic material manufactured using any suitable method, including, but not limited to extrusion, casting, forging, press forming, roll forming, punching, machining, additive manufacturing (e.g., printing), stamping, combinations thereof and/or other forming techniques. In some embodiments, the manufacturing method of deep draw stamping the inner skin stiffener and single-piece forming the foam may be readily adaptable to high volume automotive component production.

The outer skin casing 20 may be formed of any suitable material with high ductility, high strength, and relatively low to moderate modulus, including, but not limited to, metallic alloys (e.g., aluminum 6061), carbon fiber composites, polymer composites, metal matrix composites, various steels, high-strength plastics, combinations thereof, and/or any other suitable material. In some embodiments, the outer skin casing may be configured to be joined to a portion of the vehicle and/or to neighboring UDUs using any suitable joining methods, including, but not limited to, mechanical joining including crimping, screws or brads, fasteners, welding (including friction stir welding and other forms of solid state welding), high-strength adhesives, combinations thereof, and/or any other suitable method.

Figure 5:
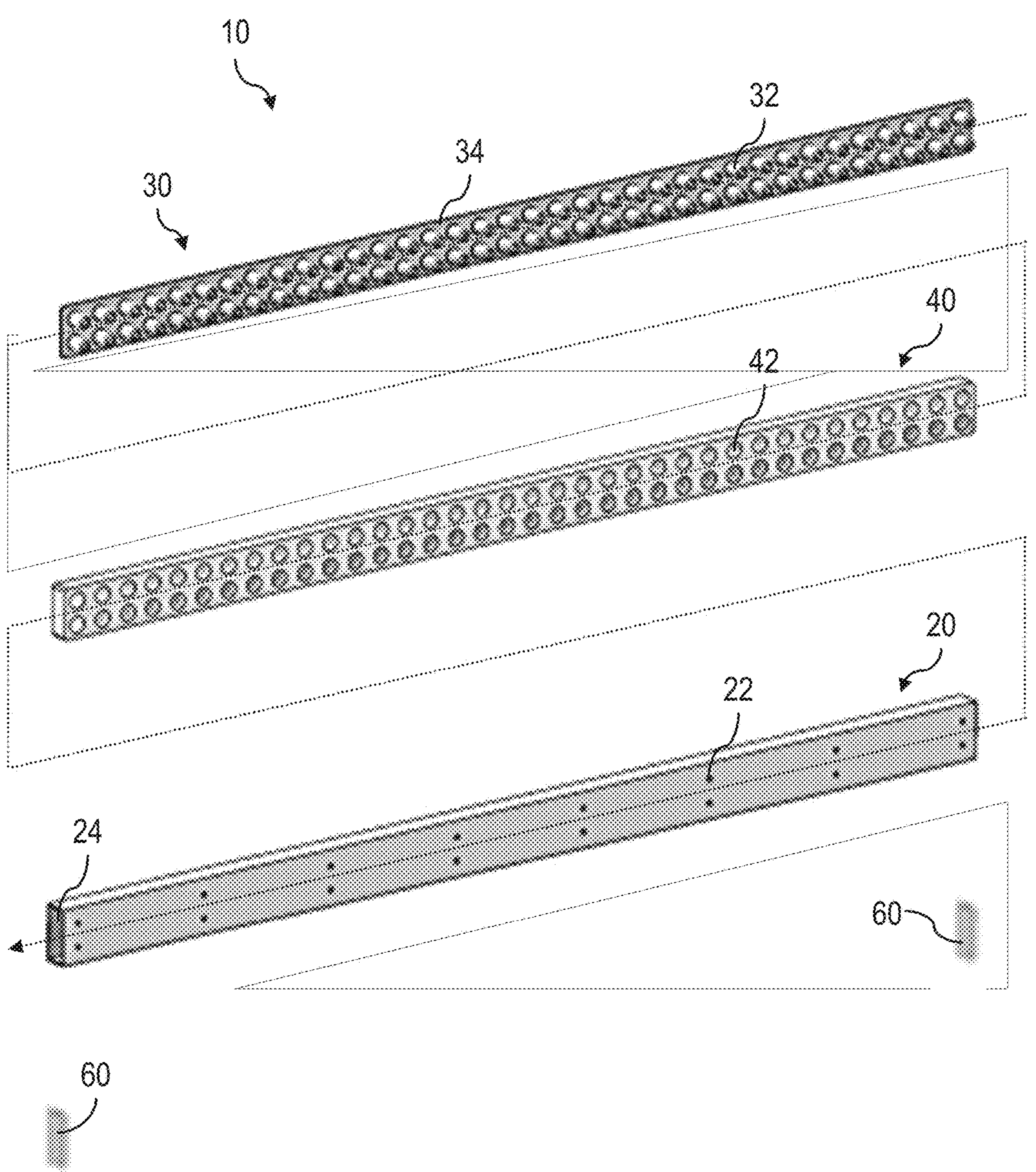
FIG. 5 is an exploded view of the safety device of FIG. 4.

FIG. 5 illustrates an exploded view of various components of the UDU 10 shown in FIG. 4. In some embodiments, a UDU may include an inner skin stiffener 30, which may be coupled to an energy absorber 40 formed of low density energy absorption material and inserted into an outer skin casing 20. The inner skin stiffener 30 and energy absorber 40 may be retained or sealed within the outer skin casing 20 with an end plate 60 attached to an end portion 24 of the outer skin casing 20. It should be appreciated that multiple end plates may be employed to secure the multiple end portions 24 of the outer skin casing.

In some embodiments, the inner skin stiffener 30 may include one or more projections 32 extending from a base plate 34. The projections 32 may be sized and arranged to fit into openings 42 of the energy absorber 40. In some embodiments, the energy absorber 40 may surround at least a portion of the projections 32 to provide structural support and, as described previously, induce uniform crush behavior during a collision by reducing the risk of projection buckling. The protrusions on the inner skin 32 and the energy absorber 40 may absorb some of the crash energy and therefore distribute the crash load for more uniform energy absorption along the UDU. In some embodiments, arranging the projections 32 into the openings 42 may also reduce the overall volumetric footprint of the assembly, enabling a low profile UDU when the assembly is inserted into the outer skin casing 20. As will be described in greater detail below, the inner skin stiffener 30 may be fixed to the outer skin casing 20 using fasteners inserted through openings 22 of the outer skin casing 20.

In some embodiments, the projections may be arranged in the outer skin casing so that they are positioned relatively normal to an anticipated crushing direction. The shape of the projections may enable the inner skin stiffener to absorb energy from crash and deform. In some embodiments, the process of deforming the projections may provide extra strength in addition to energy absorption, as the deformed projections may be stronger than the undeformed projections. In this way, the projections may serve to further stiffen the UDU during a crushing procedure, reducing the impact of the crash on the rest of the vehicle, which may reduce overall damage.

As described previously, both the inner skin stiffener and the outer skin casing may absorb crash energy and deform up to the yield point of the UDU, which may establish a maximum force of the energy absorbing structure. In some embodiments, the various geometries and dimensions of both the outer skin casing and the inner skin stiffener may be adjusted to achieve a desirable yield force, and subsequent maximum impact force, of the UDU. Once the maximum force exerted on the UDU has been reached, the UDU may begin to yield and plastically deform, through either the inner skin stiffener and/or the energy absorber of low density material. The energy absorber of low density material may support the inner skin stiffener such that the maximum force is maintained near the initial maximum for a prescribed crush distance, as shown in FIG. 2B. In some embodiments, maintaining a maximum absorption force on the UDU for a prescribed distance may result in a near-ideal low density material that may extract the maximum possible energy from the crash event, and limit the transfer of crash energy into the vehicle. In embodiments where aluminum foam is used as the energy absorber, the inherent constant force crush plateau of the material may be utilized in conjunction with the uniform crushing of the inner skin stiffeners to maintain the UDU crush force at a near constant value for a predetermined distance. In this way, the total crash energy, measured as the integral of the crash force absorbed over time, may be maximized.

Figure 6:
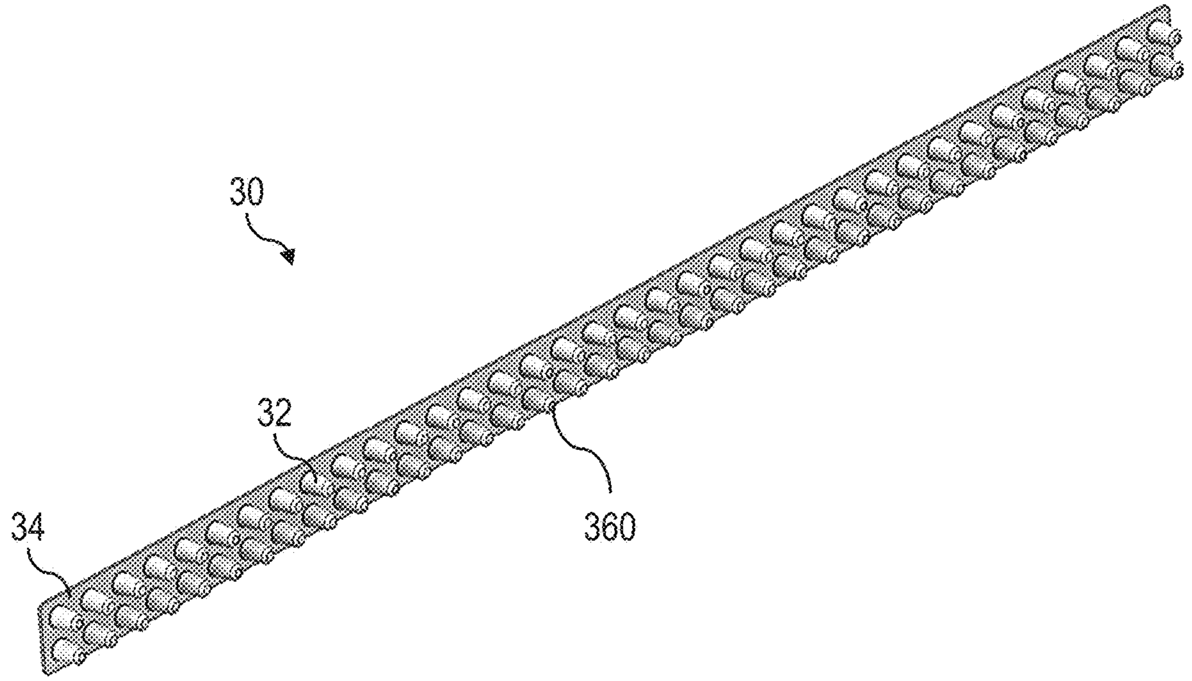
FIG. 6 is a top perspective view of an inner skin stiffener according to some embodiments.
Figure 7A:
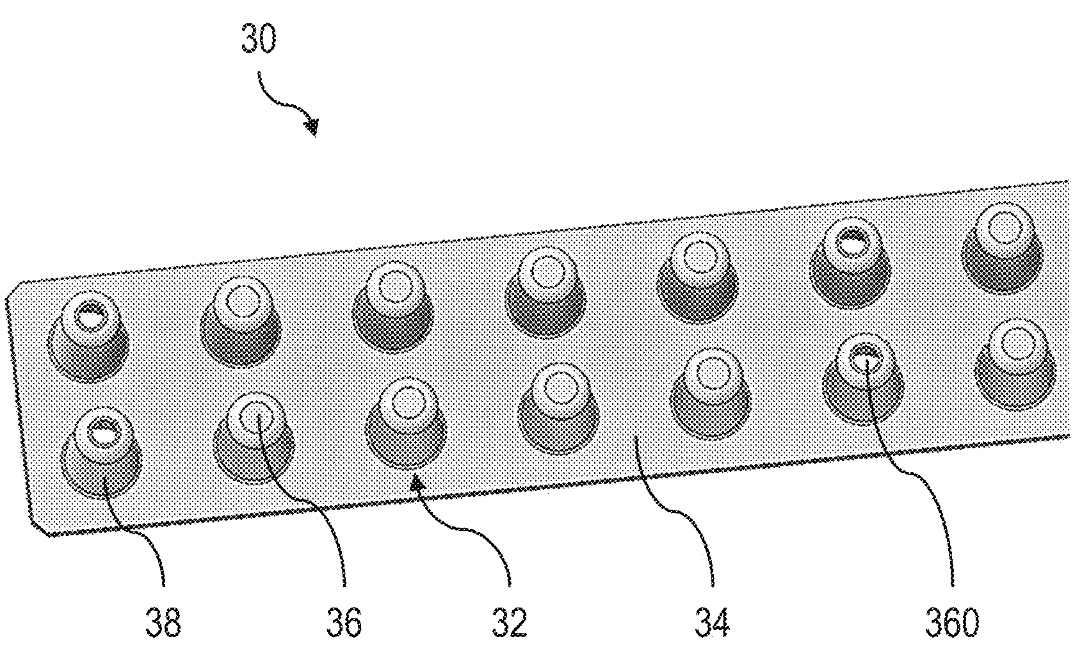
FIGS. 7A-7B are partial close-up views of the inner skin stiffener of FIG. 6.
Figure 7B:
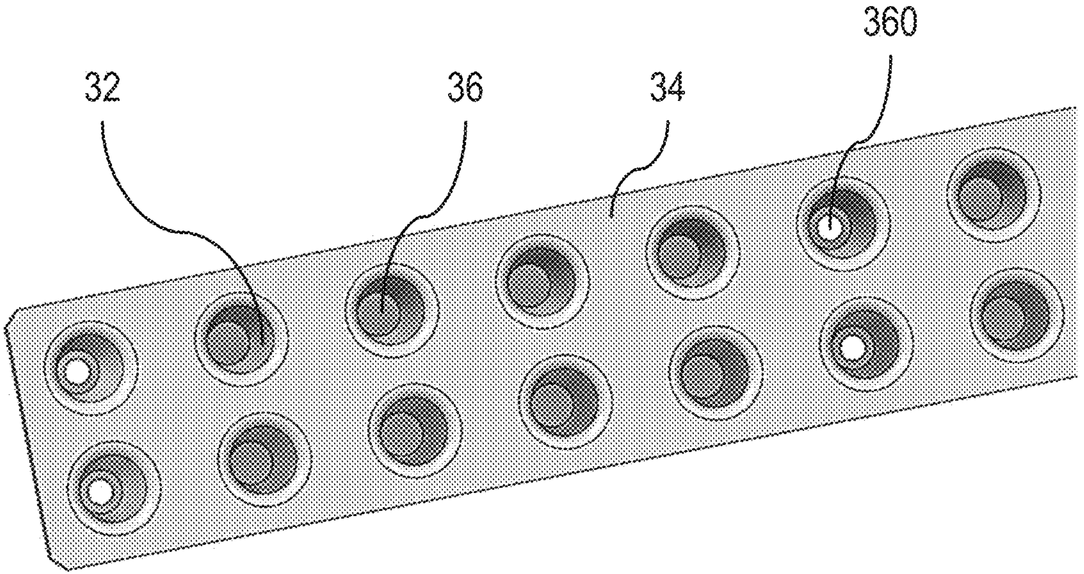

FIG. 6 illustrates an inner skin stiffener 30 according to some embodiments, with FIGS. 7A-7B illustrating a portion of the inner skin stiffener 30 from FIG. 6 for better clarity. The inner skin stiffener may include one or more projections 32 extending from a base plate 34 to a projection tip 36. In some embodiments, the projections 32 may be press-formed (e.g., deep drawn) from the base plate 34, although alternative means of achieving the monolithic stiffener are also contemplated. In some embodiments, one or more of the projection tips 36 may include a hole 360 or other opening, as shown in FIGS. 7A-7B. The hole may be formed by drilling, punching out or otherwise removing material from the projection tip. These holes 360 may be threaded or otherwise structured to engage with fasteners to help fix the inner skin stiffener to the outer skin casing (see casing 20 in FIG. 5).

In some embodiments, an inner skin stiffener 30 may include two rows of projections 32, as shown in FIGS. 6-7, with every fifth column of projections 32 having a hole 360. It should be appreciated that any number of rows of projections 32 may be employed, including, but not limited to, one row, two rows, three rows, four rows, five rows, six rows, and/or any other suitable number of rows. The number of rows may be determined by the overall size of the UDU, the arrangement of the UDU within the vehicle, as well as the desired energy absorption profile. Accordingly, the present disclosure is not limited by the number of rows of projections.

Similarly, although FIG. 6 schematically illustrates 36 columns of projections 32, it should be appreciated that any number of columns (and/or total projections) may be employed to provide a desired energy absorption profile. The UDUs described herein may employ greater than or equal to 6, 12, 18, 24, 30, 36, 42, 48, 54, 60, and/or any other suitable columns of projections. The UDUs may also employ less than or equal to 60, 54, 48, 42, 36, 30, 24, 18, 12, 6, and/or any other suitable columns of projections. Combinations of the foregoing ranges, including a UDU having between 6 and 60 columns of projections, are also contemplated. It should be appreciated that the various arrangements of projections may be specifically designed to achieve a desired energy absorption profile for a particular application. As such, the present disclosure is not limited by the number of rows, columns, and/or total number of projections It should also be appreciated that although holes 360 are shown to be formed in every fifth column of both rows in FIGS. 7A-7B, other arrangements of holes 360 are also contemplated. In some embodiments, every projection may include a hole at its projection tip. In some embodiments, the holes may occur at a frequency of once per 2, 3, 4, 5, 6, 7, 8, 9, 10, 12, 15, 20, and/or any other number of projections. It should be appreciated that the ratio of holes and projections may be determined by the desired strength of connection between the inner skin stiffener and the outer skin casing, as the holes may serve as connection points (e.g., using a fastener) with the outer skin casing. Accordingly, the UDUs described herein may employ any number of holes, as the present disclosure is not so limited.

It should be appreciated that although the projections are shown to be circular in cross-section, projections with non-circular profiles are also contemplated. For example, pyramidal projections are also contemplated. The specific configuration of the projections may be designed to achieve a desired energy absorption behavior. In some embodiments, the draft angle of the projection side walls may provide resistance to axial buckling as well as the ability to handle oblique loading, including bending and torsion load components, while limiting the risk of buckling or collapse. In some embodiments, the conical shape of the projections may be tolerant of off-axis (e.g., oblique) loads that might otherwise cause collapse or buckling of a tubular or rib-and-web structure. Accordingly, the conically shaped projections may be well suited for side impacts where the vehicle encounters the impact body at oblique angles.

In some embodiments, the projections may be designed to achieve a desired energy absorption profile without any low density energy absorbing materials positioned in the interstitial spaces of the projections. Thus, the shape (e.g., conical) of the projections may minimize or entirely eliminate the need for low density materials within the UDU. It should be appreciated that the present disclosure is not limited by the presence, number, or arrangement of energy absorbers of low density materials.

Accordingly, the cross-section of the projections may be any suitable geometry, as the present disclosure is not limited by the geometry of the projections. In some embodiments, the projections may be circular in cross-section for manufacturing simplicity and reduced costs. Embodiments with non-circular openings are also contemplated.

Furthermore, although the projections 32 are shown to be arranged in a square-like pattern on base plate 34, any other pattern of projections 32 may be employed to achieve a desired energy absorption profile. For example, the projections may be arranged in a square-like, rectangular, triangular, hexagonal, pentagonal, randomized, combinations thereof, and/or any other suitable pattern.

The inner skin stiffener may be formed using any suitable method, including, but not limited to extrusion, casting, forging, press forming, punching, machining, additive manufacturing (e.g., printing), stamping, combinations thereof and/or other forming techniques. The inner skin stiffener 30 may be formed of any suitable material with high ductility, high strength, and relatively low modulus, including, but not limited to, metallic alloys (e.g., aluminum 6061), carbon fiber composites, polymer composites, metal matrix composites, various steels, high-strength plastics, combinations thereof, and/or any other suitable material. In some embodiments, the inner skin stiffener may be joined to the outer skin casing using any suitable joining methods, including, but not limited to, mechanical joining including crimping, screws or brads, fasteners, welding (including friction stir welding and other solid state joining methods), high-strength adhesives, combinations thereof, and/or any other suitable method. It should be appreciated that while in some embodiments, the outer skin casing and the inner skin stiffener may be formed of the same material and/or method, embodiments in which the outer skin casing and the inner skin stiffener are formed of different materials and/or methods are also contemplated.

Figure 8A:
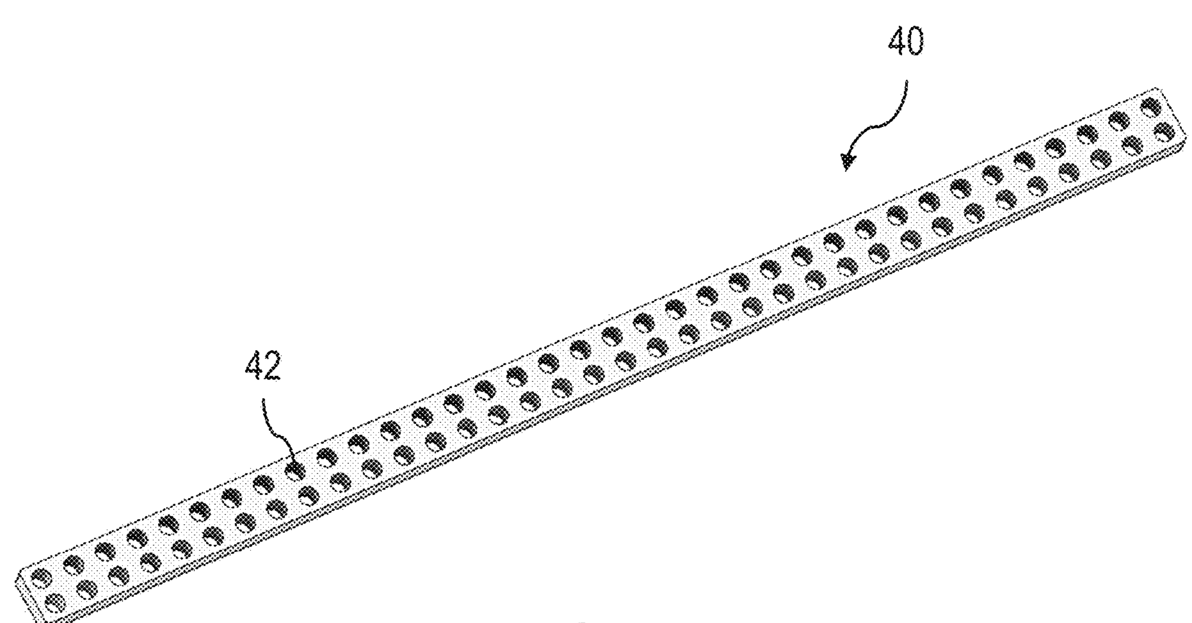
FIG. 8A is a top perspective view of an energy absorber of low density material according to some embodiments.
Figure 8B:
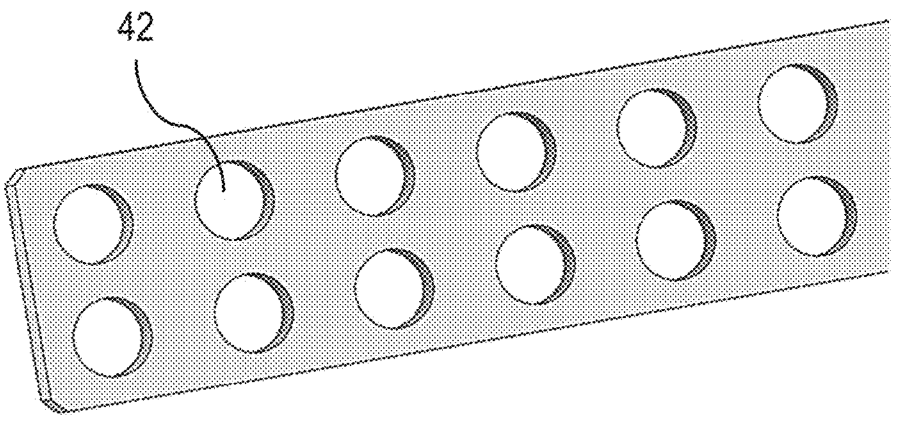
FIG. 8B is a partial enlarged view of the energy absorber of low density material of FIG. 8A.

In some embodiments, the projections of the inner skin stiffener may correspond to openings of an energy absorber formed of a low density energy absorption material (e.g., metallic foam, honeycomb, and/or other similar materials), such that the projections may be inserted at least partially into the openings. In this way, the energy absorber may serve to provide energy absorption in the interstitial spaces of the projections to achieve a desired energy absorption profile. In some embodiments, the inclusion of energy absorbers of low density materials may enhance the energy absorption of the UDU, distributing crash loads along the UDU. As schematically illustrated by FIGS. 8A-8B, various openings 42 may be punched out or otherwise formed in an energy absorber 40. The openings 42 may be through holes, extending through the entire thickness of the energy absorber 40, as shown in FIG. 8B, or may, in some embodiments, extend only partially through the energy absorber. It should be appreciated that although the openings are shown to be circular in cross-section, energy absorbers with non-circular openings are also contemplated. Any suitable opening cross-section to engage with the projections of the inner skin stiffener may be employed, as the present disclosure is not limited by the geometry of the energy absorber openings.

It should be appreciated that energy absorber 40 may be formed of any low density material, as described in greater detail above. The energy absorbing material may also be optionally bonded to various portions of the outer skin casing, end caps, and/or inner skin stiffeners using a high strength adhesive.

Figure 9A:
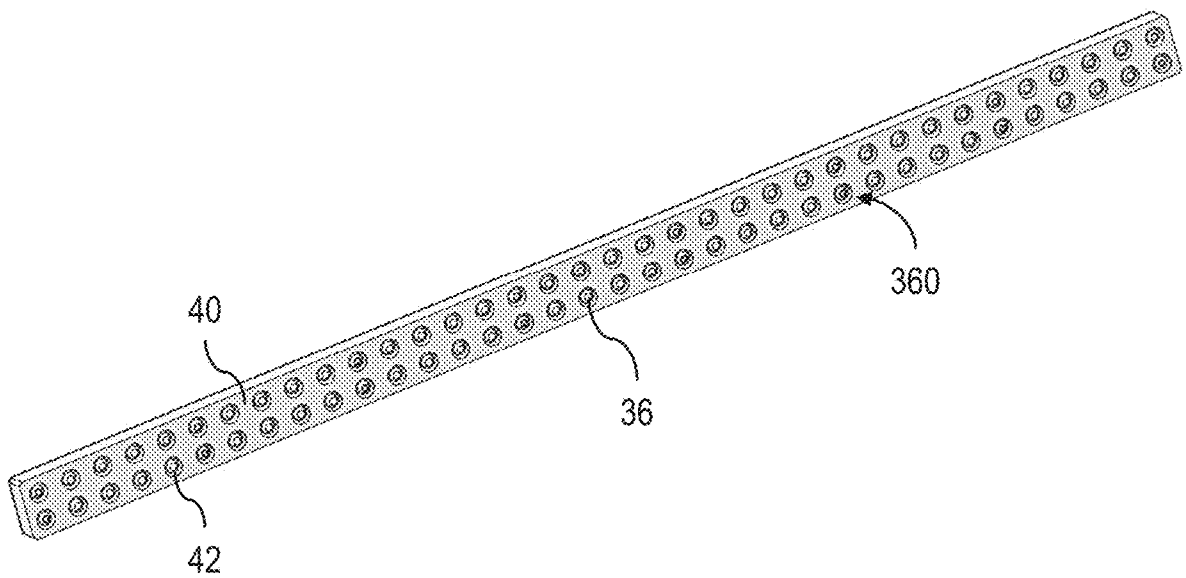
FIGS. 9A-9B are perspective views of a partial assembly of a safety device according to some embodiments.
Figure 9B:
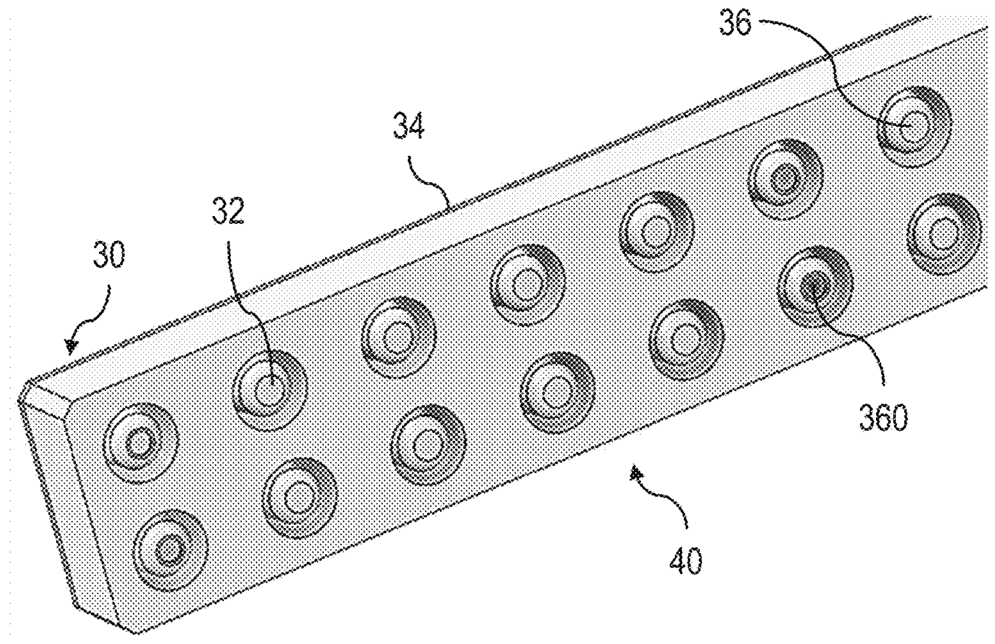
Figure 10:
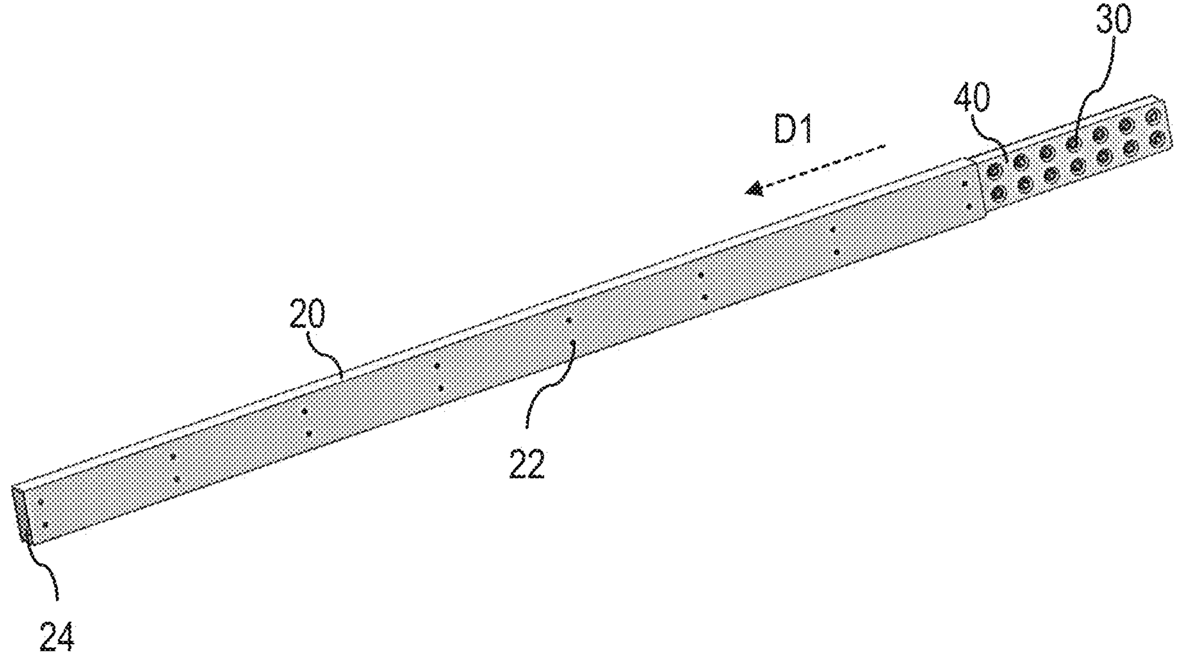
FIG. 10 is a perspective view of a partial assembly of a safety device according to some embodiments.

FIGS. 9-10 illustrate an assembly process for a UDU according to some embodiments. An inner skin stiffener 30 may be assembled with an energy absorber 40 such that projections 32 of the inner skin stiffener are positioned within openings 42 of the energy absorber 40, as shown in FIGS. 9A-9B. In some embodiments, not shown, low density energy absorbing materials may also be arranged into the hollow side of the projections as well as around the projections. As noted previously, embodiments with no low density material are also contemplated, dependent on the energy absorption behavior of the inner skin stiffener. The assembly of the energy absorber and the inner skin stiffener may subsequently be inserted into an outer skin casing 20, as shown in FIG. 10. As discussed previously, the outer skin casing 20 may be extruded, with two end portions 24, such that the low density material and stiffener assembly may be inserted into the outer skin casing through one end portion, along a direction D1 extending parallel to a longitudinal axis of the outer skin casing. The energy absorber and stiffener assembly may be configured to allow the holes of the inner skin stiffener (see holes 360 in FIGS. 7A-7B) to align with openings 22 of the outer skin casing 20. In this way, one or more fasteners may be arranged in the openings 22 to fix the inner skin stiffener and energy absorber assembly to the outer skin casing, as shown in the assembled UDU of FIG. 4.

In some embodiments, end portions 24 may be capped with one or more end caps 60 as shown in FIG. 4. It should be appreciated that the outer skin casing structure may include any number of other features, such as brackets or flanges with machined holes for fastener attachment or for welding to the vehicle body structure, as the present disclosure is not so limited.

In some embodiments, the end caps 60 may limit the exposure of the internal components (e.g., one or more energy absorbers of low density materials and one or more inner skin stiffeners) to environmental conditions such as moisture. In some embodiments, the end caps 60 may be shaped to cover the energy absorber 40 and the inner skin stiffener 30 assembly to minimize the risk of the energy absorber and stiffener assembly from falling out of the outer skin casing 20. The end caps may be bonded to the outer skin casing, energy absorber and/or inner skin stiffener using a high strength adhesive. In some embodiments, the assembled UDU may optionally be coated to protect the assembly from moisture, road salt, engine fluids, dirt, gravel, and stones. The coating may be poly-urea based tough coating and/or a polymer powder coating, although alternative coatings and/or treatments are also contemplated.

Figure 11A:
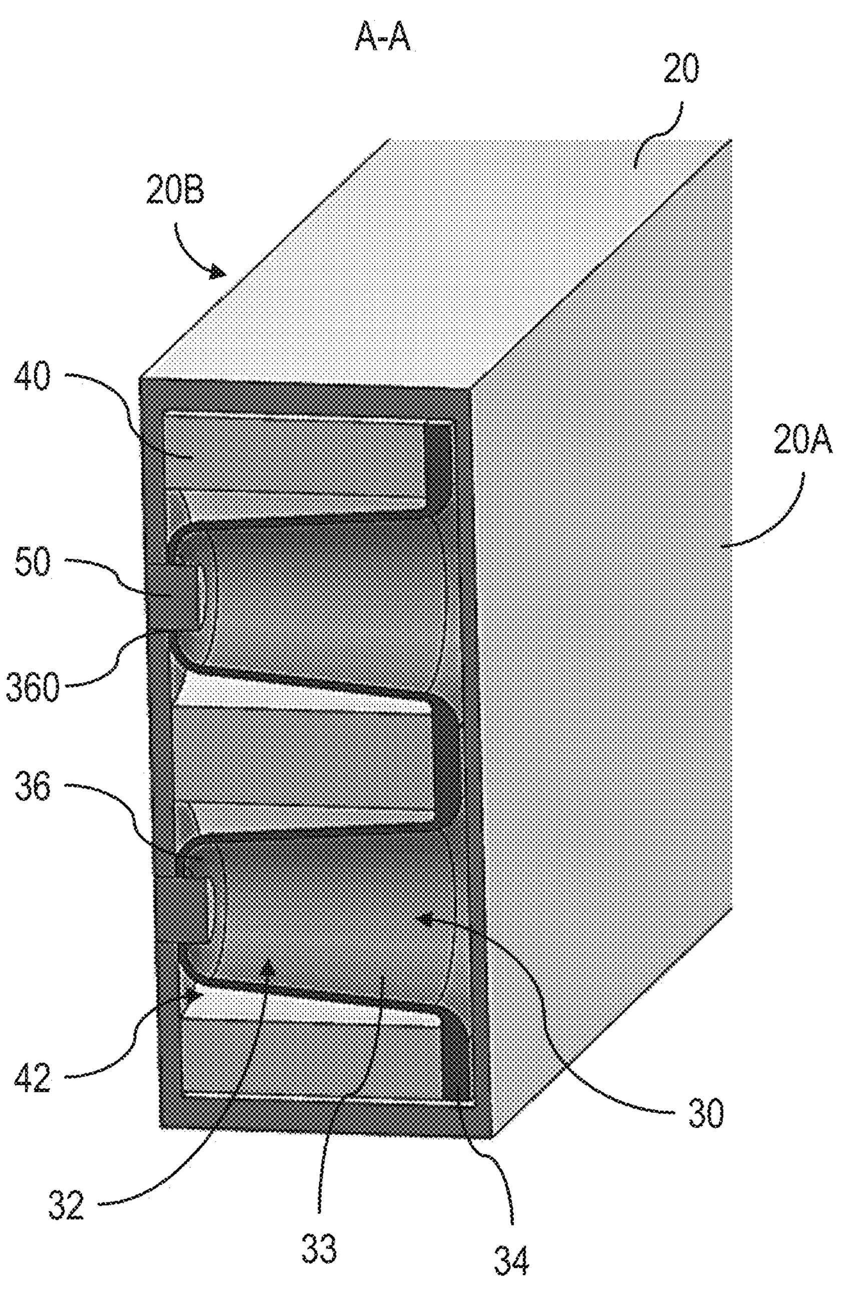
FIGS. 11A-11B are cross-sectional views of the UDU taken along section line A-A of FIG. 4.
Figure 11B:
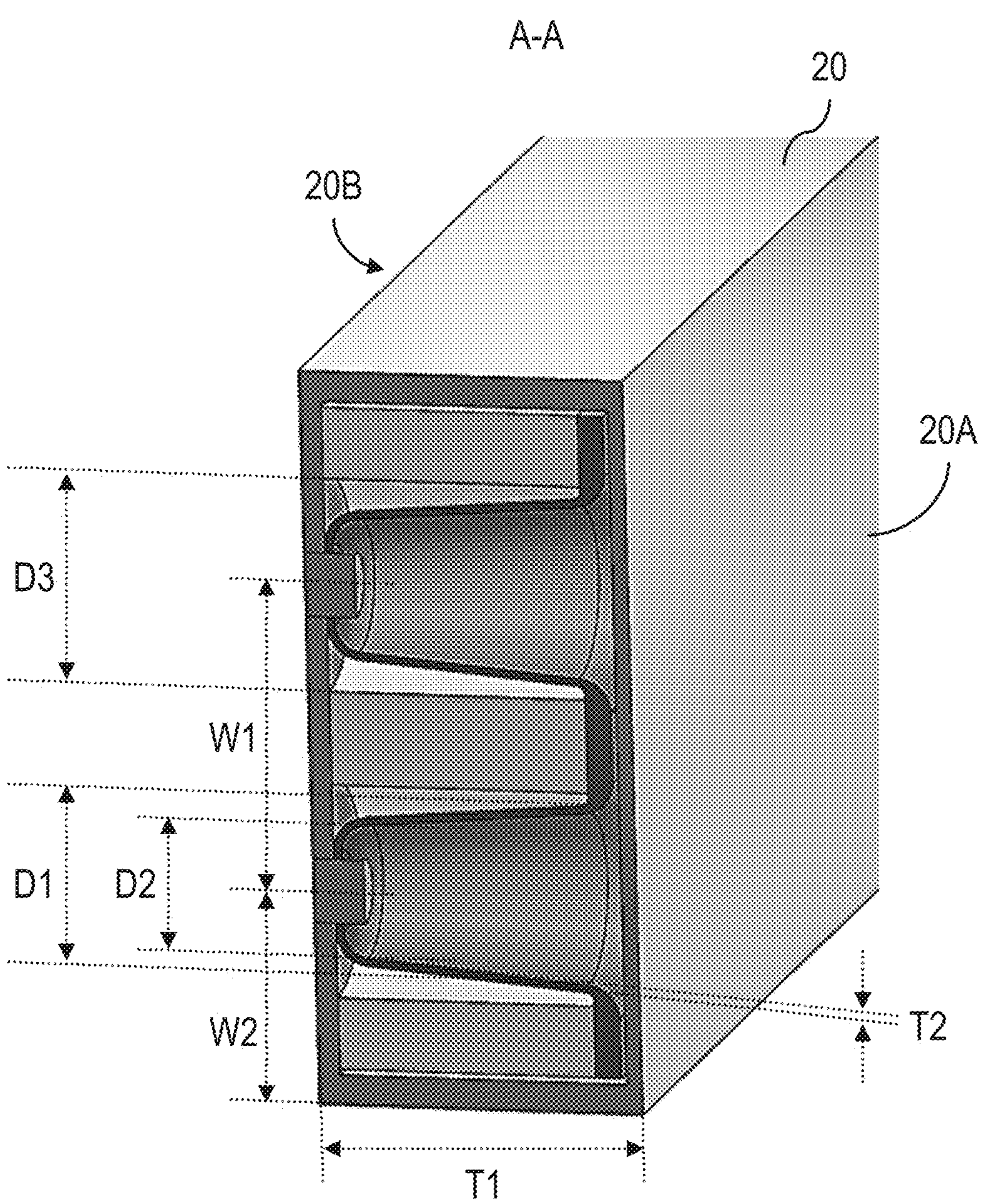

FIGS. 11A-11B illustrate a partial cross-section of the assembled UDU of FIG. 4 along section line A-A. In some embodiments, as represented by FIG. 11A, the UDU may include an inner skin stiffener 30 assembled with an energy absorber 40, with projections 32 positioned within openings 42 of the energy absorber 40. It should be appreciated that UDUs with low density materials arranged inside the inner diameters of the projections, in addition to or instead of low density material positioned between neighboring projections, are also contemplated. As described previously, in some embodiments, one or more of the projections may include a hole 360 in their projection tip 36. The holes 360 may correspond with openings (see openings 22 in FIG. 10) of a casing 20. The hole 360 may be structured (e.g., threaded) to engage with fasteners 50 to help secure the assembly of the inner skin stiffener and low density material within the outer skin casing 20. In some embodiments, connecting the outer skin casing and the inner skin stiffener together using fasteners may reduce the risk of the inner skin stiffener from sliding out or disengaging from the outer skin casing. The fasteners may also help maintain the energy absorber 40 in place, given the arrangement of the projections 32 relative to the openings 42. The energy absorbing low density material may also be bonded to the press-formed inner skin structure with adhesives prior to assembly inside the casing. In some embodiments, fastening the outer skin casing with the inner skin stiffener may also enhance the structural integrity of the UDU. The connection of the outer skin casing, which may itself be formed of a high strength material, with the inner skin stiffener may therefore enhance the energy absorption of the UDU.

In some embodiments, as shown in FIG. 11A, the projections 32 may be press formed from a base plate 34. Each projection 32 may have sidewalls 33 extending from the base plate 34 positioned proximal to a first face 20A of the outer skin casing 20 to a second face 20B of the outer skin casing 20. In some embodiments, the sidewalls 33 may have a uniform thickness, as shown in FIG. 11A. Embodiments in which the sidewalls 33 have a variable thickness are also contemplated, as the present disclosure is not so limited. The sidewalls 33 may have any suitable thickness profile to achieve the desired energy absorption profile.

In some embodiments, as shown in FIGS. 7A and 11A-11B, the projections 32 may have a generally conical shape. It should be appreciated that alternative shapes are also contemplated, such as cylindrical, square-shaped, triangular, combinations thereof, and/or any other shape that achieves the desired energy absorption profile.

As shown in FIG. 11B, the conically shaped projections 32 may have a first diameter D1 proximal to the first face 20A of the outer skin casing and a second diameter D2 proximal to the second face 20B of the outer skin casing. In some embodiments, D1 and D2 may be substantially equal, whereas in other embodiments, D1 may be less than or greater than D2. In embodiments where the projections are substantially conical, as shown in FIG. 11B, D1 may be greater than D2. It should be appreciated that either diameter D1 and/or D2 may be any suitable value to achieve a desired energy absorption profile, as the present disclosure is not limited by the geometry of the projections.

It should be appreciated that the projections 32 (and associated openings 42 of the low density material) may be arranged in any suitable pattern and distribution to achieve a desired energy absorption profile. In some embodiments, the projections 32 may be arranged in a linear fashion, spaced apart by width W1, as shown in FIG. 11B. Width W1 may be any suitable distance, including, but not limited to, 20 mm, 25 mm, 30 mm, 40 mm, 50 mm, and/or any other suitable distance, including widths less than or greater than the widths described.

In some embodiments, the arrangement of the projections may also be characterized by the distance W2 between the projection and a side wall of the outer skin casing, as shown in FIG. 11B. Width W2 may be any suitable distance, including but not limited to, 10 mm, 15 mm, 18 mm, 20 mm, 30 mm, and/or any other suitable distance, including widths less than or greater than the widths described.

In some embodiments, the openings 42 of the energy absorber 40 (see FIGS. 11A-11B) may be sized and shaped to accommodate the projections 32 of the inner skin stiffener. As described previously, low density energy absorbing material may also be arranged inside of the conical projections. In some embodiments, the openings may be shaped to surround the projections (e.g., the openings may be shaped as the negative space of the projections). The openings may be formed to balance high throughput manufacturing as well as energy absorption. Accordingly, the openings may have a uniform cross-section across a thickness of the UDU (see thickness T1, for example). The opening diameter D3, as shown in FIG. 11B may be any suitable value, including, but not limited to 20 mm, 25 mm, 30 mm, 40 mm, and/or any other suitable diameter, including less than or greater than the diameters described. In other embodiments, the openings may be non-uniform across the thickness of the UDU. It should be appreciated that the present disclosure is not limited by the cross-sectional geometry of the openings in the energy absorber.

In some embodiments, the projections of the inner skin stiffener may be press-formed to have a uniform thickness T2, as shown in FIG. 11B. The uniform thickness may enable the projections to stiffen upon energy absorption, and/or, may be a result of the high throughput manufacturing process. The thickness T2 of the projections may be any suitable value, including, but not limited to, 0.1 mm, 0.5 mm, 1 mm, 2 mm, and/or any other suitable thickness, including less than or greater than the thicknesses described. Embodiments employing non-uniform projection thicknesses are also contemplated, including linearly increasing projection thickness along the UDU thickness (see thickness T1, for example), and/or non-linearly increasing projection thickness.

It should be appreciated that the various geometric parameters described herein may be adjusted depending on the desired energy absorption profile of the UDU, the placement of the UDU within the vehicle (e.g., in the side sill, in the bumper), the make and model of the vehicle in which the UDU is installed, and/or any other number of parameters. Accordingly, the present disclosure is not limited by the size, number, arrangement (e.g., pattern, distribution) of the projections, energy absorber openings, and/or any other portion of the UDU. The geometry of the projections (e.g., projection taper angle, projection wall thickness, projection height) may control the stiffness or stiffness gradient of the inner skin stiffeners, and may be adjusted to achieve a desired energy absorption profile depending on the aforementioned parameters. Accordingly, the present disclosure is not limited by the geometric parameters of any of the components described herein.

Figure 12:
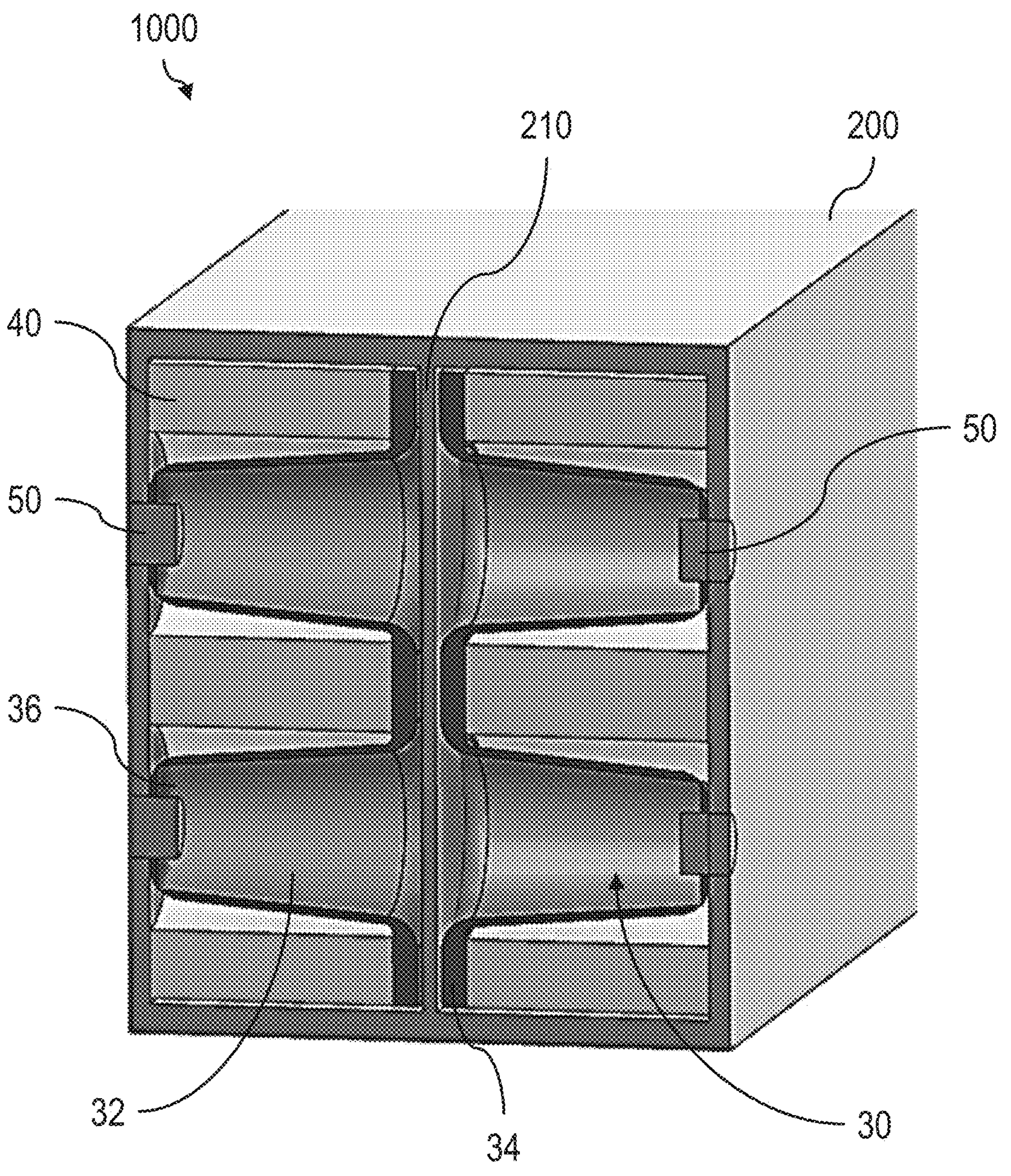
FIG. 12 is a cross-sectional view of a safety device according to other embodiments.

FIG. 12 shows a cross-sectional view of a UDU 1000 employing multiple inner skin stiffeners and energy absorbers according to some embodiments. The UDU shown in FIG. 12 may employ at least two inner skin stiffeners 30 and at least two energy absorbers to provide a desired energy absorption profile. In some embodiments, a casing 200 may include a partition 210 which may serve as a support element in between the two inner skin stiffeners. The partition 210 may also absorb energy and control the rate of crash energy transfer between the two (or more) inner skin stiffeners. It should be appreciated that any number of inner skin stiffener layers, and corresponding partitions, may be employed to achieve a suitable energy absorption profile. In some embodiments, the various components described herein (e.g., inner skin stiffener, energy absorbers, etc.) may be employed in a crash box or multi-layer UDUs.

As shown in FIG. 12, the outer skin casing 20 may include openings (see openings 22 in FIG. 10) to accommodate two sets of fasteners 50, each on one side of the outer skin casing 20. It should be appreciated that although the two inner skin stiffeners are shown to be arranged in a mirrored fashion, alternative arrangements of inner skin stiffeners relative to one another are also contemplated. It should also be appreciated that although two inner skin stiffeners are shown in UDU 1000, embodiments with more than two inner skin stiffeners are also contemplated, as the present disclosure is not limited by the number or relative arrangement of the inner skin stiffeners.

Figure 13A:
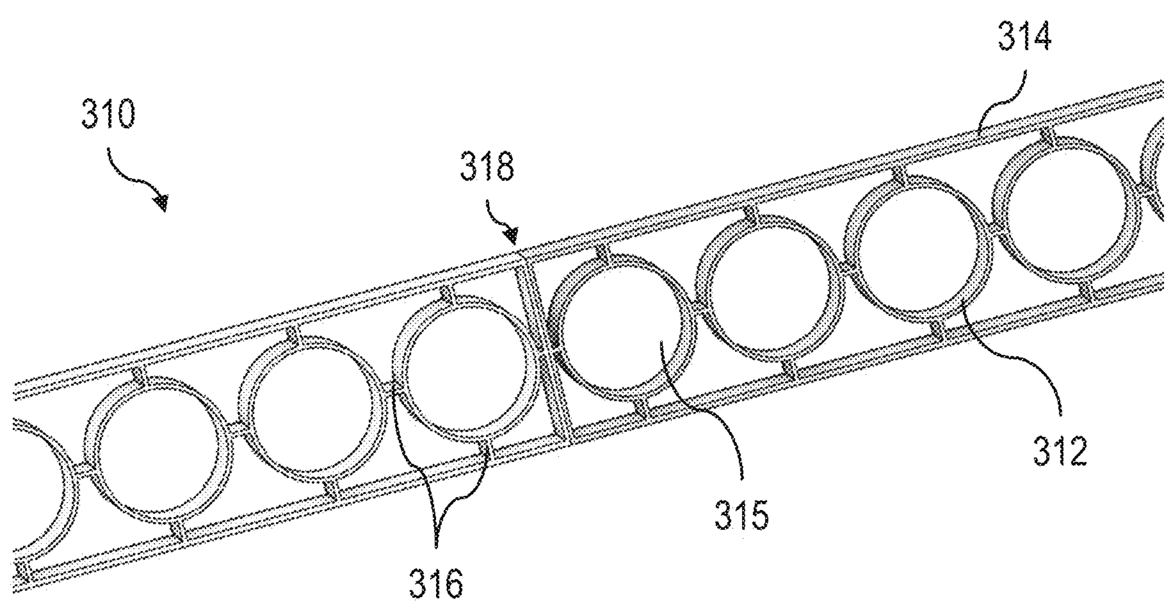
FIGS. 13A-13B are perspective views of inner skin stiffeners according to other embodiments still.
Figure 13B:
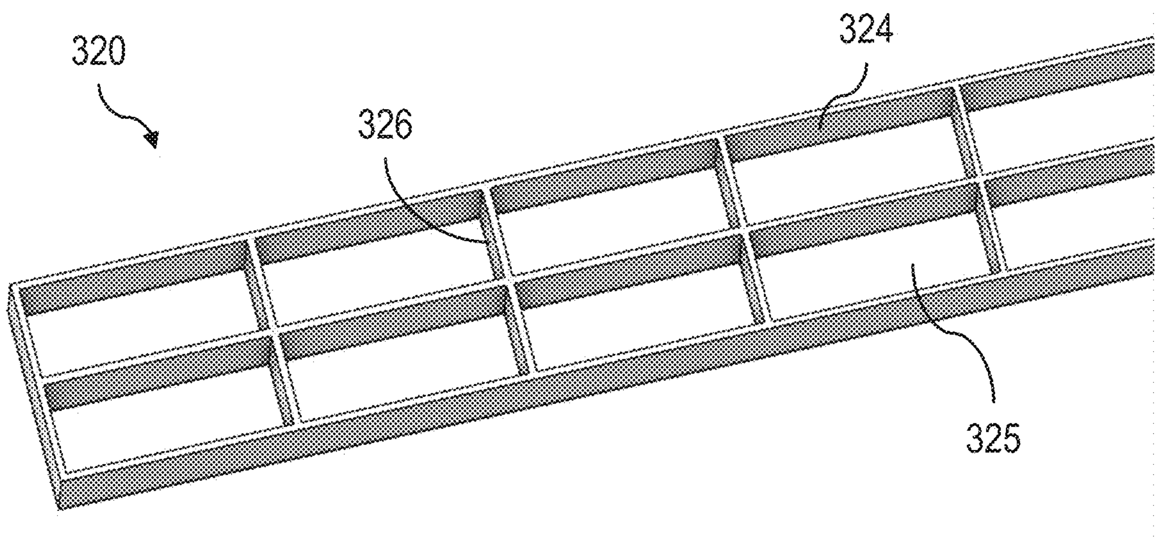

FIGS. 13A-13B illustrate various embodiments of inner skin stiffeners 310, 320. In some embodiments, a UDU may employ an inner skin stiffener 310, 320 to provide a desired energy absorption profile.

In some embodiments as illustrated in FIG. 13A, an inner skin stiffener 310 may include circular webs 312 arranged inside one or more skins 314. The webs and skins may be connected with a variety of ribs 316. In some embodiments, the pockets 315 of the inner skin stiffener 310 may be filled with an energy absorbing material, which may include a low density material (e.g., a metallic foam) to provide a desired energy absorption profile.

In some embodiments as illustrated in FIG. 13B, the inner skin stiffener 320 may include a variety of linear webs 326 arranged in between skins 324. The pockets 325 of the webs may be filled with a low density cellular matrix.

The inner skin stiffeners 310, 320 may be extruded for ease of manufacturing. In some embodiments, neighboring stiffener segments may be joined to one another (see, for example, weld 318 in FIG. 13A) using any suitable technique, including, but not limited to, friction stir welding. It should be appreciated that the specific shapes and arrangements of the webs, skins, and ribs shown in FIGS. 13A-13B are exemplary and that alternative shapes and arrangements are also contemplated.

In some embodiments, a multi-layer UDU (similar to that shown in FIG. 12) may include one or more inner skin stiffeners similar to stiffener 30 of FIGS. 7A-7B in a first layer, and one or more inner skin stiffeners similar to inner skin stiffeners 310, 320 of FIGS. 13A-13B in a second layer. Accordingly, combinations of various inner skin stiffeners described herein may be used in any of the UDUs described herein.

It should be appreciated that any of the UDUs described herein may employ any suitable number of inner skin stiffeners and/or energy absorbers, as the present disclosure is not limited by the number of components used to achieve a desired energy absorption profile. In some embodiments, a monolithic stiffener may be employed with a plurality of energy absorbers in a single casing. In other embodiments, a plurality of inner skin stiffeners may be employed with a monolithic energy absorber. Embodiments in which parallel or neighboring inner skin stiffeners and/or energy absorbers are employed are also contemplated.

For purposes of this patent application and any patent issuing thereon, the indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

The use of "including," "comprising," "having," "containing," "involving," and/or variations thereof herein, is meant to encompass the items listed thereafter and equivalents thereof as well as additional items.

It should also be understood that, unless clearly indicated to the contrary, in any methods claimed herein that include more than one step or act, the order of the steps or acts of the method is not necessarily limited to the order in which the steps or acts of the method are recited.

The foregoing description of various embodiments are intended merely to be illustrative thereof and that other embodiments, modifications, and equivalents are within the scope of the invention recited in the claims appended hereto.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

Any terms as used herein related to shape, orientation, alignment, and/or geometric relationship of or between, for example, one or more articles, structures, forces, fields, flows, directions/trajectories, and/or subcomponents thereof and/or combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter.

What is claimed is:

1. A vehicle safety device comprising:

an outer skin casing having an outer skin casing longitudinal axis, the outer skin casing configured to be arranged in a side sill of a vehicle;

at least one energy absorber arranged within the outer skin casing, the at least one energy absorber having a plurality of openings; and at least one inner skin stiffener arranged within the outer skin casing, the at least one inner skin stiffener having a plurality of projections extending normal to the outer skin casing longitudinal axis, wherein the plurality of projections are arranged at least partially in the plurality of openings.

2. The vehicle safety device of claim 1, wherein the at least one inner skin stiffener is press-formed.

3. The vehicle safety device of claim 1, wherein the at least one inner skin stiffener is fastened to the outer skin casing.

4. The vehicle safety device of claim 1, wherein the at least one energy absorber is formed of a material comprising a porosity of between 80% and 94%.

5. The vehicle safety device of claim 1, wherein the at least one energy absorber is formed of a metallic foam.

6. The vehicle safety device of claim 1, wherein the plurality of projections are conically shaped.

7. The vehicle safety device of claim 1, wherein the at least one inner skin stiffener comprises at least two inner skin stiffeners each comprising an inner skin stiffener longitudinal axis, and wherein the inner skin stiffener longitudinal axes of the at least two inner skin stiffeners are arranged parallel to the outer skin casing longitudinal axis.

8. The vehicle safety device of claim 1, wherein the plurality of projections are arranged to extend substantially parallel to a direction of crash force.

9. The vehicle safety device of claim 1, wherein the outer skin casing is an extruded casing.

10. The vehicle safety device of claim 1, wherein the at least one inner skin stiffener comprises more than one inner skin stiffener, and wherein the more than one inner skin stiffener is joined together with a solid state welding process.

11. A method of forming a vehicle safety device, the method comprising:

providing an outer skin casing having an outer skin casing longitudinal axis;

providing at least one energy absorber having a plurality of openings;

providing at least one inner skin stiffener having a plurality of projections extending normal to the outer skin casing longitudinal axis;

punching one or more holes at a distal end of a subset of the plurality of projections;

arranging the plurality of projections into the plurality of openings; and positioning the at least one inner skin stiffener and the at least one energy absorber inside the outer skin casing.

12. The method of claim 11, wherein the plurality of projections of the at least one inner skin stiffener are press-formed.

13. The method of claim 11, further comprising fastening the at least one inner skin stiffener to the outer skin casing.

14. The method of claim 11, wherein the at least one energy absorber is formed of a material comprising a porosity of between 80% and 94%.

15. The method of claim 11, wherein the at least one energy absorber is formed of a metallic foam.

16. The method of claim 11, further comprising securing one or more end caps to the outer skin casing to retain the at least one energy absorber and the at least one inner skin stiffener within the outer skin casing.

17. The method of claim 11, wherein the at least one inner skin stiffener comprises a plurality of skin stiffeners, each of which comprises an inner skin stiffener longitudinal axis, and further comprising arranging at least two of the plurality of inner skin stiffeners such that the inner skin stiffener longitudinal axes of such at least two inner skin stiffeners are parallel to the outer skin casing longitudinal axis.

18. The method of claim 11, further comprising arranging the plurality of projections to be substantially parallel to a direction of crash force.

19. The method of claim 11, wherein the at least one inner skin stiffener comprises a plurality of ribs and webs.

* * * * *